(12) United States Patent
Kawanishi

(10) Patent No.: US 8,119,934 B2
(45) Date of Patent: Feb. 21, 2012

(54) COMBINATION WEIGHER INCLUDING A SINGLE HOPPER LINE

(75) Inventor: Shozo Kawanishi, Nishinomiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 420 days.

(21) Appl. No.: 12/297,040

(22) PCT Filed: Apr. 4, 2007

(86) PCT No.: PCT/JP2007/057584
§ 371 (c)(1),
(2), (4) Date: Apr. 9, 2009

(87) PCT Pub. No.: WO2007/122999
PCT Pub. Date: Nov. 1, 2007

(65) Prior Publication Data
US 2010/0012394 A1    Jan. 21, 2010

(30) Foreign Application Priority Data

Apr. 14, 2006  (JP) ................................. 2006-111908
Nov. 20, 2006  (JP) ................................. 2006-312768

(51) Int. Cl.
*G01G 19/387* (2006.01)
(52) U.S. Cl. .................................................. 177/25.18
(58) Field of Classification Search ............... 177/25.18, 177/145
See application file for complete search history.

(56) References Cited

U.S. PATENT DOCUMENTS

| | | | | |
|---|---|---|---|---|
| 4,399,880 A * | 8/1983 | Konishi | ............................ | 177/1 |
| 4,534,429 A * | 8/1985 | Konishi | ........................... | 177/50 |
| 4,630,695 A * | 12/1986 | Connors et al. | ................... | 177/1 |
| 4,676,326 A * | 6/1987 | Konishi | ............................ | 177/1 |
| 4,846,291 A * | 7/1989 | Osawa et al. | ............... | 177/25.18 |
| 4,967,856 A | 11/1990 | Kawanishi et al. | | |
| 5,088,569 A * | 2/1992 | Checcucci | ..................... | 177/145 |
| 5,359,154 A * | 10/1994 | Tsukasa et al. | ................ | 177/145 |
| 6,437,256 B1 * | 8/2002 | Miyamoto | ................. | 177/25.18 |
| 7,038,145 B2 * | 5/2006 | Fujii | .......................... | 177/25.18 |

FOREIGN PATENT DOCUMENTS

EP    0 269 785 A1    6/1988
(Continued)

OTHER PUBLICATIONS

International Search Report for PCT/JP2007/057584, dated Jul. 3, 2007.
(Continued)

*Primary Examiner* — Randy W Gibson
(74) *Attorney, Agent, or Firm* — Marshall, Gerstein & Borun LLP

(57) ABSTRACT

A combination weigher includes weighing hoppers capable of discharging weighed objects selectively in a first direction or in a second direction, a first collecting chute and a collecting hopper, a second collecting chute and a collecting hopper, and a control unit configured to determine a first discharge combination and a second discharge combination in which combination weight values fall within an allowable range with respect to a target weight value, to cause weighing hoppers belonging to the first discharge combination to discharge the weighed objects in the first direction, to cause weighing hoppers belonging to the second discharge combination to discharge the objects to be weighed in the second direction, and to cause the collecting hopper and the collecting hopper to discharge the objects to be weighed.

36 Claims, 15 Drawing Sheets

| | FOREIGN PATENT DOCUMENTS | |
|---|---|---|
| GB | 2183854 | 6/1987 |
| GB | 2189614 | 10/1987 |
| JP | 57-125322 | 8/1982 |
| JP | 58-161829 | 9/1983 |
| JP | 62-254017 | 11/1987 |
| JP | 01-170815 | 7/1989 |
| JP | 03-144318 | 6/1991 |
| JP | 05-016928 | 1/1993 |
| JP | 2645391 B | 5/1997 |

OTHER PUBLICATIONS

Supplemental European Search Report for EP 07 74 1020, dated Jan. 10, 2011.

Office Action for Canadian Patent Application No. 2,649,282, dated Apr. 5, 2011.

* cited by examiner

COMBINATION WEIGHER INCLUDING A SINGLE HOPPER LINE

TECHNICAL FIELD

The present invention relates to a combination weigher which includes combination hoppers such as weighing hoppers which are arranged in a straight-line shape and are selected to make up of a combination, and feeds to a packaging machine or the like, objects to be weighed which have been weighed.

BACKGROUND ART

Objects to be weighed, such as detergents and confectionary, which have been weighed to have specified weight by a combination weigher, are typically packaged by a packaging machine. An example of such a combination weigher which weighs the objects to be weighed includes weighing hoppers arranged in a straight-line shape as shown in FIG. 15 (see for example, Japanese Laid-Open Patent Application Publication No. Sho. 58-161829).

FIG. 15(a) is a schematic view of a conventional combination weigher as viewed from above and FIG. 15(b) is a schematic view of the combination weigher as viewed from the front.

The combination weigher includes a plurality of feeding hoppers 3 and a plurality of weighing hoppers 4 which are arranged in a straight-line shape, and a collecting chute 6 located therebelow, and is configured such that a control unit 30 controls an operation of the entire combination weigher and performs combination calculation. The feeding hopper 3 is supplied with the objects to be weighed from a means which is not shown, and feeds the objects to be weighed to the weighing hopper 4 located therebelow when the weighing hopper 4 becomes empty. The weighing hopper 4 is attached with a weight sensor such as a load cell. The weight sensor measures the weight of the objects to be weighed inside the weighing hopper 4 and sends a measured value to the control unit 30. The control unit 30 performs combination calculation based on the weight values of the objects to be weighed inside the weighing hoppers 4 to select a combination made up of hoppers which will discharge the objects to be weighed, from the plurality of weighing hoppers 4. The weighing hoppers 4 selected to make up of the combination discharge the objects to be weighed onto the collecting chute 6. The objects to be weighed which have been discharged from the weighing hoppers 4 slide down on the collecting chute 6 and are discharged from a discharge outlet at a bottom part of the collecting chute 6. The objects to be weighed are sent out to, for example, a packaging machine which is not shown. While manufacturing package bags, the packaging machine charges into the package bags the objects to be weighed which have been discharged from the combination weigher, and packages them.

There is a combination weigher in which a belt conveyor replaces the collecting chute 6 in the configuration of FIG. 15 (see for example, Japanese Laid-Open Patent Application Publication No. Hei. 5-016928). In this configuration, the objects to be weighed which have been discharged from the weighing hoppers 4 are put on the belt conveyor and are conveyed in one direction. The objects to be weighed are fed from the belt conveyor to, for example, a packaging machine disposed at an end portion of the belt conveyor in a direction in which the objects to be weighed are conveyed, and are packaged there.

DISCLOSURE OF THE INVENTION

Problems to be Solved by the Invention

In a case where a high-speed operation (high-speed combination discharge operation) is carried out for the purpose of improving a productivity (total number of times the objects to be weighed are discharged from the combination weigher to the packaging machine) within a specified time in the conventional configuration shown in FIG. 15, a speed of the objects to be weighed which have been discharged from the weighing hopper 4 and slide down on the collecting chute 6 is not increased even though a discharge time interval of the objects to be weighed which are discharged from the weighing hopper 4 becomes short. For this reason, unless the operation speed is set low, a sufficient distance cannot be provided between a batch of the objects to be weighed which are discharged from weighing hoppers 4 selected to make up of a previous combination and a batch of the objects to be weighed which are discharged from weighing hoppers 4 selected to make up of a subsequent combination, or they are likely to be mixed, on the collecting chute 6, depending on characteristic of the objects to be weighed, for example, when the objects to be weighed are bulky (bulk density is low). As a result, the high-speed operation is difficult to carry out, and as a result, productivity cannot be improved.

In the configuration in which the collecting chute 6 is replaced by the belt conveyor, before completion of discharging the objects to be weighed on the belt conveyor which have been discharged from weighing hoppers 4 selected to make up of a previous combination, weighing hoppers 4 selected to make up of a subsequent combination cannot discharge the objects to be weighed onto the belt conveyor. In addition, a conveying speed of the belt conveyor is limited. For these reasons, the high-speed operation is difficult to carry out.

Even if the high-speed operation is achieved in the configuration in which the collecting chute or the belt conveyor is disposed below the weighing hoppers 4, there is a need for, for example, a sorting device at a discharge outlet of the combination weigher to separately discharge the objects to be weighed to a plurality of packaging machine inlets, in order to feed the objects to be weighed into the plurality of packaging machine inlets in the configuration in which a plurality of packaging machines or a packaging machine having a plurality of inlets are/is disposed below or in a subsequent stage of the combination weigher. As should be appreciated, it is not easy to configure the combination weigher in this way.

The present invention has been developed to solve the above described problems, and an object of the present invention is to provide a combination weigher which is capable of improving productivity within a specified time and of easily feeding objects to be weighed to a plurality of packaging machine inlets.

Means for Solving the Problem

With a view to achieving the above described object, a combination weigher according to a first aspect of the present invention comprises a hopper line formed by a plurality of combination hoppers which are arranged in a straight-line shape and are each fed with objects to be weighed, the plurality of combination hoppers being each configured to be able to discharge the objects to be weighed selectively in a first direction which is perpendicular to a direction in which the combination hoppers are arranged, or in a second direction which is perpendicular to the direction in which the combination hoppers are arranged; a first discharge means which is disposed below the hopper line and is configured to transfer the objects to be weighed which have been discharged from the combination hoppers in the first direction and to discharge the objects to be weighed to a first discharge position; a second discharge means which is disposed below the hopper line such that the first discharge means and the second discharge means are arranged side by side, and is configured to transfer the objects to be weighed which have been discharged from the combination hoppers in the second direction and to discharge the objects to be weighed to a second discharge position; a combination calculation means configured to determine a first discharge combination and a second discharge combination, the first discharge combination and the second discharge combination each including combination hoppers and each having a combination weight value within an allowable range with respect to a target weight value, the combination weight value being a total of weights of the objects to be weighed which are held by the combination hoppers; and a control means which is configured to cause the combination hoppers belonging to the first discharge combination to discharge the objects to be weighed in the first direction and to cause the combination hoppers belonging to the second discharge combination to discharge the objects to be weighed in the second direction.

In accordance with such a configuration, since two discharge means, i.e., the first and second discharge means are provided and the combination hoppers are able to discharge the objects to be weighed selectively to the first discharge means or to the second discharge means, a high-speed combination discharge operation (high-speed operation) can be achieved more easily as compared to using one discharge means, and as a result, a productivity within a specified time can be improved. In addition, since the two discharge means and the combination hoppers capable of discharging the objects to be weighed to the two discharge means are provided, the objects to be weighed can be easily fed into the two packaging machine inlets. As a result, the combination weigher can be easily adapted to two packaging machines or a twin-type packaging machine.

In a combination weigher of a second aspect, according to the combination weigher of the first aspect, the combination calculation means is configured to perform repetitive combination processes in such a manner that: combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately; wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means.

In such a configuration, since the combination hoppers discharge the objects to be weighed to the first discharge means and to the second discharge means alternately, a sufficient distance is provided between a batch of the objects to be weighed which are discharged previously and a batch of the objects to be weighed which are discharged subsequently, on each of the discharge means, making it easy to carry out the high-speed operation.

In a combination weigher of a third aspect, according to the combination weigher of the second aspect, the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

In such a configuration, since the combination process can be performed n times within one operation cycle time (e.g., one weighing cycle time), and the objects to be weighed can be discharged from the first and second discharge means n times in total within one operation cycle time, a productivity within a specified time period can be improved. In addition, since the objects to be weighed inside the combination hoppers are discharged to the first discharge means and to the second discharge means alternately for the respective discharge combinations determined sequentially, that is, the objects to be weighed are discharged from the combination hoppers to each of the first discharge means and the second discharge means only n/2 times within one operation cycle time, a sufficient distance can be provided between a batch of the objects to be weighed which are discharged previously and a batch of the objects to be weighed which are discharged subsequently, on each of the discharge means. In the case of n=2, a double shift operation takes place, while in the case of n=3, a triple shift operation takes place.

In a combination weigher of a fourth aspect, according to the combination weigher of the second aspect, the objects to be weighed which have been discharged from the first discharge means and the objects to be weighed which have been discharged from the second discharge means are fed into the same packaging machine inlet.

In such a configuration, since the objects to be weighed which are discharged from the first discharge means and the second discharge means are fed into the same packaging machine inlet, the combination weigher can be adapted to the high-speed operation of the packaging machine.

In a combination weigher of a fifth aspect, according to the combination weigher of the first aspect, the combination calculation means is configured to perform a combination process in such a manner that combination calculation is performed based on the weights of the objects to be weighed which are held by the combination hoppers to determine two combinations of the combination hoppers which do not include the same combination hopper and in which combination weight values obtained in the combination calculation fall within the allowable range with respect to the target weight value and to determine one of the two combinations as the first discharge combination and the other as the second discharge combination; and wherein the control means is configured to cause the combination hoppers belonging to the first discharge combination and the combination hoppers belonging to the second discharge combination to discharge the objects to be weighed simultaneously.

In such a configuration, since two discharge combinations are determined in one combination process, and the objects to be weighed belonging to the two discharge combinations are discharged simultaneously, productivity within a specified time can be improved. In addition, since the objects to be weighed belonging to one of the two discharge combinations are discharged to the first discharge means and the objects to be weighed belonging to the other discharge combination are discharged to the second discharge means, a sufficient distance can be provided between a batch of the objects to be weighed which are discharged previously and a batch of the objects to be weighed which are discharged subsequently, on each of the discharge means. Furthermore, since the two discharge combinations are determined simultaneously, weights of the objects to be weighed of a number of combination hoppers can be used in the combination calculation for determining the two discharge combinations. As a result, combination weighing precision for the objects to be weighed which are discharged can be improved as a whole.

In a combination weigher of a sixth aspect, according to the combination weigher of a fifth aspect, the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

In such a configuration, since the combination process is performed k times within one operation cycle time (e.g., one weighing cycle time) and the objects to be weighed can be discharged from each of the first discharge means and the second discharge means k times within one operation cycle time, the combination weigher can be easily adapted to two packaging machines operated at a high speed or a twin-type packaging machine operated at a high speed. For example, k is 2, 3, etc.

In a combination weigher of a seventh aspect, according to the combination weigher of the first aspect, the first discharge means consists of a first collecting chute which is disposed below the hopper line and is configured to gather the objects to be weighed which have been discharged from the combination hoppers in the first direction and to discharge the objects to be weighed from a discharge outlet provided at a bottom part thereof to the first discharge position; and the second discharge means consists of a second collecting chute which is disposed below the hopper line such that the first collecting chute and the second collecting chute are arranged side by side, and is configured to gather the objects to be weighed which have been discharged from the combination hoppers in the second direction and to discharge the objects to be weighed from a discharge outlet provided at a bottom part thereof to the second discharge position.

In such a configuration, since two collecting chutes, i.e., the first and second collecting chutes are provided and the combination hoppers are able to discharge the objects to be weighed selectively to the first collecting chute or to the second collecting chute, a high-speed combination discharge operation (high-speed operation) is achieved more easily as compared to using one collecting chute, and as a result, a productivity within a specified time can be improved. In addition, by using the two collecting chutes, the combination weigher can be easily adapted to two packaging machines or a twin-type packaging machine.

In a combination weigher of an eighth aspect, according to the combination weigher of the first aspect, the first discharge means includes a first collecting chute which is disposed below the hopper line, and is configured to gather the objects to be weighed which have been discharged from the combination hoppers in the first direction and to discharge the objects to be weighed from a discharge outlet provided at a bottom part thereof, and a first collecting hopper provided at the discharge outlet of the first collecting chute, and is configured to hold the objects to be weighed which have been discharged from the discharge outlet and to discharge the objects to be weighed to the first discharge position; wherein the second discharge means includes a second collecting chute which is disposed below the hopper line such that the first collecting chute and the second collecting chute are arranged side by side, and is configured to gather the objects to be weighed which have been discharged from the combination hoppers in the second direction and to discharge the objects to be weighed from a discharge outlet provided at a bottom part thereof, and a second collecting hopper provided at the discharge outlet of the second collecting chute, and is configured to hold the objects to be weighed which have been discharged from the discharge outlet and to discharge the objects to be weighed to the second discharge position; and wherein the control means is configured to control the first collecting hopper and the second collecting hopper to cause the first collecting hopper holding the objects to be weighed which have been discharged from the combination hoppers to discharge the objects to be weighed and to cause the second collecting hopper holding the objects to be weighed which have been discharged from the combination hoppers to discharge the objects to be weighed.

In such a configuration, since two collecting chutes, i.e., the first and second collecting chutes are provided and the combination hoppers are able to discharge the objects to be weighed selectively to the first collecting chute or to the second collecting chute, a high-speed combination discharge operation (high-speed operation) is achieved more easily as compared to using one collecting chute, and as a result, a productivity within a specified time can be improved. In addition, by using two collecting chutes, the combination weigher can be easily adapted to two packaging machines or a twin-type packaging machine. Furthermore, since the objects to be weighed are discharged in a state of lumped together using the first and second collecting hoppers provided at the discharge outlets of the first and second collecting chutes, the packaging machine can easily package the objects to be weighed.

In a combination weigher of a ninth aspect, according the combination weigher of an eighth aspect, the combination calculation means is configured to perform repetitive combination processes in such a manner that combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately; wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means, and is configured to cause the first collecting hopper and the second collecting hopper to discharge the objects to be weighed alternately.

In such a configuration, since the combination hoppers discharge the objects to be weighed to the first collecting chute and to the second collecting chute alternately, a sufficient distance is provided between a batch of the objects to be weighed which are discharged previously and a batch of the objects to be weighed which are discharged subsequently, on each of the collecting chutes, making it easy to carry out the high-speed operation.

In a combination weigher of a tenth aspect, according to the combination weigher of the ninth aspect, the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

In such a configuration, since the combination process can be performed n times within one operation cycle time (e.g., one weighing cycle time), and the objects to be weighed can be discharged from the first and second collecting hoppers n times in total within one operation cycle time, a productivity within a specified time period can be improved. In addition, since the objects to be weighed inside the combination hoppers are discharged to the first collecting chute and to the second collecting chute alternately for the respective discharge combinations determined sequentially, that is, the objects to be weighed are discharged from the combination hoppers to each of the first collecting chute and to the second collecting chute only n/2 times within one operation cycle time, a sufficient distance can be provided between a batch of the objects to be weighed which are discharged previously and a batch of the objects to be weighed which are discharged subsequently on each of the collecting chutes. In the case of n=2, a double shift operation takes place, while in the case of n=3, a triple shift operation takes place.

A combination weigher of an eleventh aspect, according to the combination weigher of the ninth aspect, is configured to feed into the same packaging machine inlet, the objects to be weighed which have been discharged from the first collecting hopper and the objects to be weighed which have been discharged from the second collecting hopper.

In such a configuration, since the objects to be weighed which are discharged from the first and second collecting hoppers are fed into the same packaging machine inlet, the combination weigher can be adapted to the high-speed operation of the packaging machine.

In a combination weigher of a twelfth aspect, according to the combination of the eighth aspect, the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation fall within the allowable range with respect to the target weight value and to determine one of the two combinations as the first discharge combination and the other as the second discharge combination; and wherein the control means is configured to cause the combination hoppers belonging to the first discharge combination and the combination hoppers belonging to the second discharge combination to discharge the objects to be weighed simultaneously, and is configured to cause the first collecting hopper and the second collecting hopper to discharge the objects to be weighed simultaneously.

In such a configuration, since two discharge combinations are determined in one combination process, and the objects to be weighed belonging to the two discharge combinations are discharged simultaneously, productivity within a specified time can be improved. In addition, since the objects to be weighed belonging to one of the two discharge combinations are discharged to the first collecting chute and the objects to be weighed belonging to the other discharge combination are discharged to the second collecting chute, a sufficient distance can be provided between a batch of the objects to be weighed which are discharged previously and a batch of the objects to be weighed which are discharged subsequently, on each of the collecting chutes. Furthermore, since the two discharge combinations are determined simultaneously, weights of the objects to be weighed of a number of combination hoppers can be used in the combination calculation for determining the two discharge combinations. As a result, combination weighing precision for the objects to be weighed which are discharged can be improved as a whole.

In a combination weigher of a thirteenth aspect, according to the combination weigher of the twelfth aspect, the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

In such a configuration, since the combination process is performed k times within one operation cycle time (e.g., one weighing cycle time) and the objects to be weighed can be discharged from each of the first collecting hopper and the second collecting hopper k times within one operation cycle time (e.g., one weighing cycle time) the combination weigher can be easily adapted to two packaging machines operated at a high speed or a twin-type packaging machine operated at a high speed. For example, k is 2, 3, etc.

In a combination weigher of a fourteenth aspect, according to the combination weigher of the first aspect, the first discharge means includes a first conveyor which is disposed below the hopper line and is configured to convey in one direction the objects to be weighed which have been discharged in the first direction from the combination hoppers an6d to discharge the objects to be weighed from a conveying terminal end portion to the first discharge position; wherein the second discharge means includes a second conveyor which is disposed below the hopper line such that the first conveyor and the second conveyor are arranged side by side and is configured to convey in the one direction or in another direction the objects to be weighed which have been discharged in the second direction from the combination hoppers and to discharge the objects to be weighed from a conveying terminal end portion to the second discharge position; and wherein the control means is configured to control the first conveyor's operation for conveying the objects to be weighed and the second conveyor's operation for conveying the objects to be weighed to cause the first conveyor holding the objects to be weighed which have been discharged from the combination hoppers to discharge the objects to be weighed and the second conveyor holding the objects to be weighed which have been discharged from the combination hoppers to discharge the objects to be weighed.

In such a configuration, since two conveyors, i.e., the first and second conveyors are provided and the combination hoppers are able to discharge the objects to be weighed selectively to one of the two conveyors, a high-speed combination discharge operation (high-speed operation) is easily achieved as compared to using one conveyor, and thus a productivity within a specified time can be improved. In addition, by using the two conveyors, the combination weigher can be easily adapted to the two packaging machines or the twin-type packaging machine.

In a combination weigher of a fifteenth aspect, according to the combination weigher of the fourteenth aspect, the combination calculation means is configured to perform repetitive combination processes in such a manner that combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately; wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means, and is configured to cause the first conveyor and the second conveyor to discharge the objects to be weighed alternately.

In such a configuration, since the combination hoppers alternately discharge the objects to be weighed to the first conveyor and to the second conveyor, a sufficient distance can be provided between a batch of the objects to be weighed which are discharged previously and a batch of the objects to be weighed which are discharged subsequently, on each of the conveyors, making it easy to carry out a high-speed operation.

In a combination weigher of a sixteenth aspect, according to the combination weigher of the fifteenth aspect, the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

In such a configuration, since the combination process can be performed n times within one operation cycle time (e.g., one weighing cycle time), and the objects to be weighed can be discharged from the first and second conveyors n times in total within one operation cycle time, a productivity within a specified time period can be improved. In addition, since the objects to be weighed inside the combination hoppers are discharged to the first conveyor and to the second conveyor alternately for the respective discharge combinations determined sequentially, that is, the objects to be weighed are discharged from the combination hoppers to each of the first conveyor and the second conveyor only n/2 times within one operation cycle time, a sufficient distance can be provided between a batch of the objects to be weighed which are discharged previously and a batch of the objects to be weighed which are discharged subsequently, on each of the conveyors. In the case of n=2, a double shift operation takes place, while in the case of n=3, a triple shift operation takes place.

In a combination weigher of a seventeenth aspect, according to the combination weigher of the fifteenth aspect, the first conveyor and the second conveyor are configured to convey the objects to be weighed in the same direction; and wherein the objects to be weighed which have been discharged from the first conveyor and the objects to be weighed which have been discharged from the second conveyor are fed into the same packaging machine inlet.

In such a configuration, since the objects to be weighed which have been discharged from the first and second conveyors are fed into the same packaging machine inlet, the combination weigher can be adapted to the high-speed operation of the packaging machine.

In a combination weigher of an eighteenth aspect, according to the combination weigher of the fourteenth aspect, the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation fall within the allowable range with respect to the target weight value and to determine one of the two combinations as the first discharge combination and the other as the second discharge combination simultaneously; and wherein the control means is configured to cause the combination hoppers belonging to the first discharge combination and the combination hoppers belonging to the second discharge combination to discharge the objects to be weighed simultaneously, and is configured to cause the first conveyor and the second conveyor to discharge the objects to be weighed simultaneously.

In such a configuration, since two discharge combinations are determined in one combination process, and the objects to be weighed belonging to the two discharge combinations are discharged simultaneously, productivity within a specified time can be improved. In addition, since the objects to be weighed belonging to one of the two discharge combinations are discharged to the first conveyor and the objects to be weighed belonging to the other discharge combination are discharged to the second conveyor, a sufficient distance can be provided between a batch of the objects to be weighed which are discharged previously and a batch of the objects to be weighed which are discharged subsequently, on each of the conveyors. Furthermore, since the two discharge combinations are determined simultaneously, weights of the objects to be weighed of a number of combination hoppers can be used in the combination calculation for determining the two discharge combinations. As a result, combination weighing precision for the objects to be weighed which are discharged can be improved as a whole.

In a combination weigher of a nineteenth aspect, according to the combination weigher of the eighteenth aspect, the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

In such a configuration, since the combination process is performed k times within one operation cycle time (e.g., one weighing cycle time) and the objects to be weighed can be discharged from each of the first conveyor and the second conveyor k times within one operation cycle time, the combination weigher can be easily adapted to two packaging machines operated at a high speed or a twin-type packaging machine operated at a high speed. For example, k is 2, 3, etc.

In a combination weigher of a twenty aspect, according to the combination weigher of the fourteenth aspect, the first conveyor and the second conveyor are integral with each other to form a single conveyor.

In such a configuration, by providing a single conveyor having a large width, one drive circuit is sufficient for the conveyor, and therefore a control therefor is easier as compared to using the two conveyors.

In a combination weigher of a twenty first aspect, according to the combination weigher of the fourteenth aspect, the first conveyor and the second conveyor are each capable of changing a direction in which the objects to be weighed are conveyed.

In such a configuration, according to the locations of the packaging machines for packaging the objects to be weighed which have been discharged from the first and second conveyors, conveying directions of the first and second conveyors can be changed.

In a combination weigher of a twenty second aspect, according to the combination weigher of the first aspect, a plurality of weighing units each including the hopper line, the first discharge means, and the second discharge means are provided; wherein the combination calculation means is configured to determine the first discharge combination and the second discharge combination with respect to each of the weighing units; and wherein the control means is configured to cause the combination hoppers belonging to the first discharge combination and the combination hoppers belonging to the second discharge combination in each of the weighing units to discharge the objects to be weighed.

In such a configuration, since a plurality of weighing units is provided, productivity within a specified time can be improved. In addition, the objects to be weighed can be easily fed into a larger number of packaging machine inlets so that the combination weigher can be easily adapted to a larger number of packaging machines.

In a combination weigher of a twenty third aspect, according to the combination weigher of the twenty second aspect, the combination calculation means is configured to, for each of the weighing units, perform repetitive combination processes in such a manner that: combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately; wherein the control means is configured to, for each of the weighing units, cause the combination hoppers belonging to the first discharge combination and the combination hoppers belonging to the second discharge combination to alternately discharge the objects to be weighed, based on the first discharge combination and the second discharge combination alternately determined; and wherein the control means is configured to cause the objects to be weighed which have been discharged from the first discharge means and the second discharge means in the same weighing unit to be fed into the same packaging machine inlet, and is configured to cause the objects to be weighed which have been discharged from the first discharge means and the second discharge means in different weighing units to be fed into different packaging machine inlets.

In such a configuration, since the combination hoppers discharge the objects to be weighed to the first discharge means and to the second discharge means alternately, in each weighing unit, a sufficient distance is provided between a batch of the objects to be weighed which are discharged previously and a batch of the objects to be weighed which are discharged subsequently, on each of the discharge means, making it easy to carry out the high-speed operation. In addition, since the objects to be weighed which have been discharged from the first and second discharge means in each weighing unit are fed into the same packaging machine inlet, the combination weigher can be adapted to the packaging machine operated at a high speed.

In a combination weigher of a twenty fourth aspect, according to the combination weigher of the twenty third aspect, the combination calculation means is configured to, for each of the weighing units, perform the combination calculation based on weights of objects to be weighed which are held by combination hoppers which do not belong to an optimal combination determined in a previous combination process, in a subsequent combination process in n (n: predetermined plural number) times of successive combination processes in the repetitive combination processes.

In such a configuration, since the combination process is performed n times within one operation cycle time (e.g., one weighing cycle time) for each weighing unit, the objects to be weighed can be discharged from the first and second discharge means n times in total. As a result, productivity within a specified time period can be improved.

In a combination weigher of a twenty fifth aspect, according to the combination weigher of the twenty third aspect, the first discharge means includes a first collecting chute which is disposed below the hopper line and is configured to gather the objects to be weighed which have been discharged from the combination hoppers in the first direction and to discharge the objects to be weighed from a discharge outlet provided at a bottom part thereof to the first discharge position; and the second discharge means includes a second collecting chute which is disposed below the hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof to the second discharge position.

In such a configuration, each weighing unit includes two collecting chutes, i.e., the first collecting chute and the second collecting chute, and the objects to be weighed which are discharged alternately from the two collecting chutes are fed into the same packaging machine inlet.

In a combination weigher of a twenty sixth aspect, according to the combination weigher of the twenty third aspect, the first discharge means includes a first collecting chute which is disposed below the hopper line and is configured to gather the objects to be weighed which have been discharged from the combination hoppers in the first direction and to discharge the objects to be weighed from a discharge outlet provided at a bottom part thereof, and a first collecting hopper which is provided at the discharge outlet of the first collecting chute and is configured to hold the objects to be weighed which have been discharged from the discharge outlet and to discharge the objects to be weighed to the first discharge position; wherein the second discharge means includes a second collecting chute which is disposed below the hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof, and a second collecting hopper which is provided at the discharge outlet of the second collecting chute and is configured to hold the objects to be weighed which have been discharged from the discharge outlet and to discharge the objects to be weighed to the second discharge position; and wherein the control means is configured to cause each of the weighing units to discharge the objects to be weighed from the combination hoppers belonging to the first discharge combination and to discharge the objects to be weighed from the combination hoppers belonging to the second discharge combination alternately, and is configured to control the first collecting hopper and the second collecting hopper to cause the first collecting hopper and the second collecting hopper to discharge the objects to be weighed alternately.

In such a configuration, each weighing unit includes two collecting chutes, i.e., the first and second collecting chutes and two collecting hoppers, i.e., the first and second collecting hoppers, and the objects to be weighed which have been discharged alternately from the two collecting hoppers are fed into the same packaging machine inlet.

In a combination weigher of a twenty seventh aspect, according to the combination weigher of the twenty third aspect, the first discharge means includes a first conveyor which is disposed below the hopper line and is configured to convey in one direction the objects to be weighed which have been discharged from the combination hoppers in the first direction and to discharge the objects to be weighed from a conveying terminal end portion to the first discharge position: wherein the second discharge means includes a second conveyor which is disposed below the hopper line such that the first conveyor and the second conveyor are arranged side by side and is configured to convey in the one direction the objects to be weighed which have been discharged from the combination hoppers in the second direction and to discharge the objects to be weighed from a conveying terminal end portion to the second discharge position; and wherein the control means is configured to, for each of the weighing units, control the first conveyor's operation for conveying the objects to be weighed and the second conveyor's operation for conveying the objects to be weighed to cause the first conveyor and the second conveyor holding the objects to be weighed which have been discharged from the combination hoppers to alternately discharge the objects to be weighed.

In such a configuration, each weighing unit includes the first conveyor and the second conveyor, and the objects to be weighed which are discharged alternately from the two conveyors are fed into the same packaging machine inlet.

In a combination weigher of a twenty eighth aspect, according to the combination weigher of the twenty second aspect, the combination calculation means is configured to, for each of the weighing units, perform a combination process in such a manner that combination calculation is performed based on the weights of the objects to be weighed which are held by the combination hoppers to determine two combinations of the combination hoppers which do not include the same combination hopper and in which combination weight values obtained in the combination calculation fall within the allowable range with respect to the target weight value and to determine one of the two combinations as the first discharge combination and the other as the second discharge combination; and wherein the control means is configured to, for each of the weighing units, perform a first discharge process in which the combination hoppers belonging to the first discharge combination and the combination hoppers belonging to the second discharge combination discharge the objects to be weighed simultaneously.

In such a configuration, since two discharge combinations are determined in one combination process for each weighing unit, and the objects to be weighed belonging to the two discharge combinations are discharged simultaneously, productivity within a specified time can be improved. In addition, since the objects to be weighed belonging to one of the two discharge combinations are discharged to the first discharge means and the objects to be weighed belonging to the other discharge combination are discharged to the second discharge means, a sufficient distance can be provided between a batch of the objects to be weighed which are discharged previously and a batch of the objects to be weighed which are discharged subsequently, on each of the discharge means. Furthermore, since the two discharge combinations are determined simultaneously, combination weighing precision for the objects to be weighed which are discharged can be improved as a whole.

In a combination weigher of a twenty ninth aspect, according to the combination weigher of the twenty eighth aspect, the first discharge means includes a first collecting chute which is disposed below the hopper line and is configured to gather the objects to be weighed which have been discharged from the combination hoppers in the first direction and to discharge the objects to be weighed from a discharge outlet provided at a bottom part thereof to the first discharge position; wherein the second discharge means includes a second collecting chute which is disposed below the hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof to the second discharge position; wherein the combination calculation means is configured to perform the combination process for respective of the weighing units at the same timing; and wherein the control means is configured to perform the first discharge process for respective of the weighing units at the same timing.

In such a configuration, each weighing unit includes two collecting chutes, i.e., the first and second collecting chutes, and the objects to be weighed which have been discharged simultaneously from the two collecting chutes are fed into different packaging machine inlets. The combination process and the operation in the respective weighing units can be carried out at the same timing. Therefore, if there are p (p: plural number) weighing units, then the objects to be weighed can be fed into (2×p) packaging machine inlets simultaneously. As a result, the combination weigher can be adapted to, for example, a packaging machine which packages (2×p) sets of objects to be weighed simultaneously.

In a combination weigher of a thirtieth aspect, according to the combination weigher of the twenty eighth aspect, the first discharge means includes a first collecting chute which is disposed below the hopper line and is configured to gather the objects to be weighed which have been discharged from the combination hoppers in the first direction and to discharge the objects to be weighed from a discharge outlet provided at a bottom part thereof, and a first collecting hopper provided at the discharge outlet of the first collecting chute and is configured to hold the objects to be weighed which have been discharged from the discharge outlet and to discharge the objects to be weighed to the first discharge position; wherein the second discharge means includes a second collecting chute which is disposed below the hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof, and a second collecting hopper provided at the discharge outlet of the second collecting chute, and is configured to hold the objects to be weighed which have been discharged from the discharge outlet and to discharge the objects to be weighed to the second discharge position; wherein the combination calculation means is configured to perform the combination process for respective of the weighing units at the same timing; wherein the control means is configured to perform the first discharge process for respective of the weighing units at the same timing; and wherein the control means is configured to perform a second discharge process in which the first collecting hopper and the second collecting hopper in each of the weighing units discharge the objects to be weighed simultaneously, and is configured to control the first collecting hopper and the second collecting hopper such that the second discharge process for respective of the weighing units are performed at the same timing.

In such a configuration, each weighing unit includes two collecting chutes, i.e., the first and second collecting chutes and two collecting hoppers, i.e., the first and second collecting hoppers, and the objects to be weighed which have been discharged simultaneously from the two collecting hoppers are fed into different packaging machine inlets. The combination process and the operation in the respective weighing units are carried out at the same timing. Therefore, if there are p (p: plural number) weighing units, then the objects to be weighed can be fed into (2×p) packaging machine inlets simultaneously. As a result, the combination weigher can be adapted to, for example, a packaging machine which packages (2×p) sets of objects to be weighed simultaneously.

In a combination weigher of a thirty first aspect, according to the combination weigher of the twenty eighth aspect, the first discharge means includes a first conveyor which is disposed below the hopper line and is configured to convey in one direction the objects to be weighed which have been discharged from the combination hoppers in the first direction and to discharge the objects to be weighed from a conveying terminal end portion to the first discharge position; wherein the second discharge means includes a second conveyor which is disposed below the hopper line such that the first conveyor and the second conveyor are arranged side by side and is configured to convey in the one direction or in another direction the objects to be weighed which have been discharged from the combination hoppers in the second direction and to discharge the objects to be weighed from a conveying terminal end portion to the second discharge position; wherein the combination calculation means is configured to perform the combination process for respective of the weighing units at the same timing; wherein the control means is configured to perform the first discharge process for respective of the weighing units at the same timing; and wherein the control means is configured to perform a second discharge process in which the first conveyor and the second conveyor in each of the weighing units discharge the objects to be weighed simultaneously, and is configured to control the first conveyor's operation for conveying the objects to be weighed and the second conveyor's operation for conveying the objects to be weighed such that second discharge process for respective of the weighing units is performed at the same timing.

In such a configuration, each weighing unit includes two conveyors, i.e., the first and second conveyors, and the objects to be weighed which have been discharged from the two conveyors are fed into different packaging machine inlets.

The combination process and the operation in the respective weighing units are carried out at the same timing. Therefore, if there are p (p: plural number) weighing units, then the objects to be weighed can be fed into (2×p) packaging machine inlets simultaneously. As a result, the combination weigher can be adapted to, for example, a packaging machine which packages (2×p) sets of objects to be weighed simultaneously, if the first conveyor and the second conveyor are configured to convey the objects to be weighed in the same direction.

In a combination weigher of a thirty second aspect, according to the combination weigher of any one of the fifth, twelfth, eighteenth, and twenty eighth aspects, the combination calculation means is configured to perform the combination process including: a first process in which the combination calculation is performed based on the weights of the objects to be weighed which are held by the combination hoppers to determine, as optimal combinations, combinations made up of combination hoppers in which combination weight values fall within the allowable range with respect to the target weight value, and to determine optimal combination pairs each of which is formed by combining two optimal combinations which do not include the same combination hopper; and a second process in which for each of the optimal combination pairs, a total of absolute values of differences between combination weight values of the optimal combinations included in the optimal combination pair and the target weight value is calculated to select one optimal combination pair in which the total of the absolute values of the differences is smallest, and one of two optimal combinations included in the selected optimal combination pair is determined as the first discharge combination and the other optimal combination is determined as the second discharge combination.

In such a configuration, since the optimal combination pair in which the total of the absolute values of the differences between the combination weight values of the respective optimal combinations and the target weight value is smallest is selected, and two optimal combinations included in the selected optimal combination pair are respectively determined as the discharge combinations, combination weighing precision for the objects to be weighed which are discharged from the combination hoppers making up of the respective discharge combinations can be improved as a whole.

In a combination weigher of a thirty third aspect, according to the combination weigher of any one of the fifth, twelfth, eighteenth, and twenty eighth aspects, the combination calculation means is configured to perform the combination process including: a first process in which the combination calculation is performed based on weights of the objects to be weighed which are held by the combination hoppers to determine, as allowable combinations, combinations made up of combination hoppers in which combination weight values fall within the allowable range with respect to the target weight value, m (m: plural number) allowable combinations are selected, as first optimal combinations, from the allowable combinations, by giving priority to allowable combinations in which absolute values of differences between combination weight values and the target weight value are smaller, one allowable combination is selected as a second optimal combination from allowable combinations made up of combination hoppers obtained by excluding the combination hoppers belonging to each of the first optimal combinations, and m optimal combination pairs each of which is made up of associated first and second optimal combinations are determined; and a second process in which for each of the optimal combination pairs, a total of absolute values of differences between combination weight values of the first and second optimal combinations and the target weight value is calculated to select one optimal combination pair in which the total of the absolute values of the differences is smallest, one of the first and second optimal combinations included in the selected optimal combination pair is determined as the first discharge combination and the other of the first and second optimal combinations is determined as the second discharge combination.

In such a configuration, since the optimal combination pair in which the total of the absolute values of the differences between the combination weight values of the first and second optimal combinations and the target weight value is smallest is selected, and two optimal combinations included in the selected optimal combination pair are respectively determined as the discharge combinations, combination weighing precision for the objects to be weighed which are discharged from the combination hoppers making up of the respective discharge combinations can be improved as a whole.

In a combination weigher of a thirty fourth aspect, according to the combination weigher of any one of the fifth, twelfth, eighteenth, and twenty eighth aspects, the combination calculation means is configured to perform the combination process in such a manner that the combination calculation is performed based on the weights of the objects to be weighed which are held by the combination hoppers to determine, as allowable combinations, combinations made up of combination hoppers in which combination weight values fall within the allowable range with respect to the target weight value, to select as a first optimal combination one allowable combination in which an absolute value of a difference between a combination weight value and the target weight value is smallest, from the allowable combinations, to select as a second optimal combination one allowable combination in which an absolute value of a difference between a combination weight value and the target weight value is smallest, from allowable combinations made up of combination hoppers obtained by excluding the combination hoppers belonging to the first optimal combination, and to determine that one of the first and second optimal combinations is the first discharge combination and the other of the first and second optimal combinations is the second discharge combination.

In such a configuration, since one allowable combination in which the absolute value of the difference between the combination weight value and the target weight value is smallest, is selected as the first optimal combination, from all the allowable combinations, one allowable combination in which an absolute value of a difference between a combination weight value and the target weight value is smallest, is selected as a second optimal combination, from allowable combinations made up of combination hoppers obtained by excluding the combination hoppers belonging to the first optimal combination, and the two optimal combinations are respectively determined as the discharge combinations, combination weighing precision for the objects to be weighed which are discharged from the combination hoppers making up of the respective discharge combinations can be improved as a whole.

In the above described combination weigher, the combination hoppers may be weighing hoppers each of which has two weighing chambers arranged side by side in the direction in which the combination hoppers are arranged and is configured to measure weights of the objects to be weighed which are held by the weighing chambers, the weighing chambers being each configured to be able to discharge the objects to be weighed selectively in the first direction or in the second direction; and the combination calculation means may be configured to determine the first discharge combination and the second discharge combination such that the first and second discharge combinations each includes weighing chambers holding the objects to be weighed whose total weight falls within the allowable range with respect to the target weight value.

In such a configuration, since the weighing hoppers each having two weighing chambers are provided as the combination hoppers, the number of weight values used in the combination calculation can be increased so that combination weighing precision can be improved, without increasing the arrangement length of the combination hoppers in the direction in which the combination hoppers are arranged.

In the above described combination weigher, a plurality of weighing hoppers may be disposed above the combination hoppers to respectively correspond to the combination hoppers to measure weights of the objects to be weighed which are held by the weighing hoppers; the combination hoppers may be memory hoppers each of which has two accommodating chambers which are fed with the objects to be weighed whose weights have been measured by the weighing hoppers, the accommodating chambers being each configured to be able to discharge the objects to be weighed selectively in the first direction or in the second direction; the weighing hoppers may be each configured to be able to discharge the objects to be weighed selectively to one of two accommodating chambers of an associated memory hopper; and the combination calculation means may be configured to determine the first discharge combination and the second discharge combination such that the first and second discharge combinations each includes accommodating chambers holding the objects to be weighed whose total weight falls within the allowable range with respect to the target weight value.

In such a configuration, since the memory hoppers each having two accommodating chambers are provided as the combination hoppers, the number of weight values used in the combination calculation can be increased so that combination weighing precision can be improved, without increasing the arrangement length of the combination hoppers in the direction in which the combination hoppers are arranged.

In the above described combination weigher, the combination hoppers may be arranged along two upper lines and one lower line; the combination hoppers located on the two upper lines may be weighing hoppers each of which measures weight of the objects to be weighed held by the weighing hopper, and the combination hoppers located on the one lower line are memory hoppers each of which corresponds to two weighing hoppers and is fed with the objects to be weighed whose weight has been measured by the weighing hopper; the objects to be weighed which are discharged in the first direction from the weighing hopper located on a line of the two upper lines which is closer to the first discharge means, may be discharged to the first discharge means, and the objects to be weighed which are discharged in the second direction from the weighing hopper located on the line closer to the first discharge means are discharged to an associated memory hopper; and the objects to be weighed which are discharged in the first direction from the weighing hopper located on a line of the upper two lines which is closer to the second discharge means may be discharged to the associated memory hopper, and the objects to be weighed which are discharged in the second direction from the weighing hopper located on the line closer to the second discharge means may be discharged to the second discharge means.

In such a configuration, since the weighing hoppers on the upper two lines and the memory hoppers on the lower one line are provided as the combination hoppers, the number of weight values used in the combination calculation can be increased so that combination weighing precision can be improved, without increasing the arrangement length of the combination hoppers in the direction in which the combination hoppers are arranged.

EFFECTS OF THE INVENTION

The present invention has the above described configuration, and has advantages that a combination weigher can be provided, which is capable of improving productivity within a specified time and of easily feeding the objects to be weighed into a plurality of packaging machine inlets.

The above and further objects, features and advantages of the present invention will more fully be apparent from the following detailed description of preferred embodiments with accompanying drawings.

Figure 1:
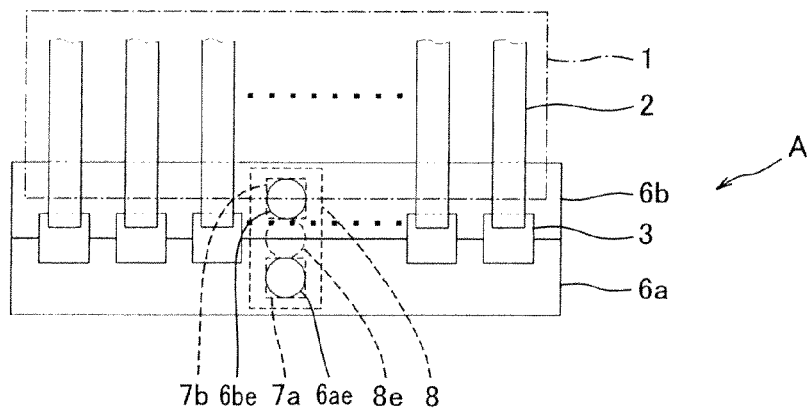
FIG. 1(a) is a schematic view of a combination weigher according to an embodiment of the present invention as viewed from above.
FIG. 1(b) is a schematic view of the combination weigher as viewed from the front.
FIG. 1(c) is a schematic view of the combination weigher as viewed from the side.
Figure 1:
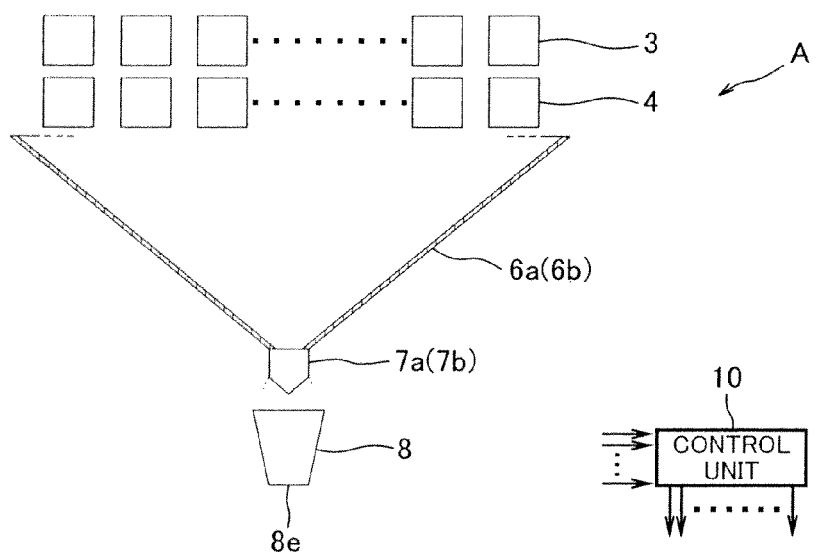
Figure 1:
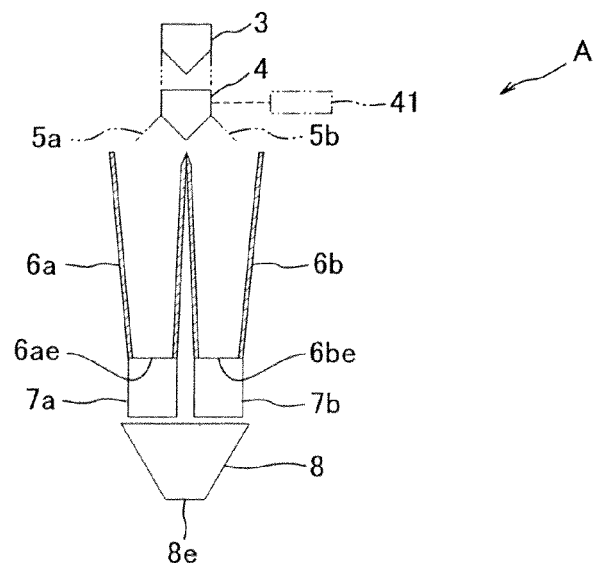

DESCRIPTION OF REFERENCE NUMERALS 2 vibration feeder
3 feeding hopper
4 weighing hopper
5a first gate
5b second gate
6a first collecting chute
6b second collecting chute
7a first collecting hopper
7b second collecting hopper
8 lower chute
10, 20 control unit

BEST MODE FOR CARRYING OUT THE INVENTION

Hereinafter, preferred embodiments of the present invention will be described with reference to the drawings.

Embodiment 1

FIG. 1(a) is a schematic view of a combination weigher according to an embodiment 1 of the present invention as viewed from above, FIG. 1(b) is a schematic view of the combination weigher as viewed from the front, and FIG. 1(c) is a schematic view of the combination weigher as viewed from the side.

The combination weigher includes a plurality of feeding hoppers 3 arranged in a straight-line shape and a plurality of weighing hoppers 4 arranged in a straight-line shape such that the feeding hoppers 3 respectively correspond to the weighing hoppers 4.

Each weighing hopper 4 is attached with a weight sensor 41 (FIG. 1(c)) such as a load cell which measures a weight of the objects to be weighed inside the weighing hopper 4. Each weight sensor 41 outputs a measured value to a control unit 10. The feeding hopper 3 disposed just above each weighing hopper 4 is fed with the objects to be weighed from an associated vibration feeder 2 located thereabove. Each vibration feeder 2 is supplied with the objects to be weighed from a supply means (not shown). The vibration feeders 2 may be integral with each other.

Below the weighing hoppers 4 arranged in the straight-line shape, two collecting chutes 6a and 6b each having a substantially truncated inverted quadrangular pyramid shape is disposed. Each weighing hopper 4 is provided with a first gate 5a for discharging the objects to be weighed to the first collecting chute 6a located therebelow, and a second gate 5b for discharging the objects to be weighed to the second collecting chute 6b located therebelow so that the weighing hopper 4 is able to discharge the objects to be weighed selectively to the first collecting chute 6a or to the second collecting chute 6b.

Collecting hoppers 7a and 7b are provided at discharge outlets 6ae and 6be of lower ends of the collecting chutes 6a and 6b, respectively. One lower chute 8 is disposed below the two collecting hoppers 7a and 7b. The lower chute 8 transfers the objects to be weighed which have been discharged from the collecting hoppers 7a and 7b and discharges them from a discharge outlet 8e at a bottom part thereof.

A base body which is not shown is disposed in a drive unit area 1. The vibration feeders 2, the feeding hoppers 3 and the weighing hoppers 4 are mounted to the base body. Inside base body, drive units such as vibration devices for the vibration feeders 2 and gate opening and closing devices for the feeding hoppers 3, the weighing hoppers 4, and the collecting hoppers 7a and 7b are accommodated. In addition, the weight sensors 41 respectively attached to the weighing hoppers 4 are accommodated along with the drive units inside the base body.

Below the lower chute 8 of the combination weigher, one packaging machine (not shown) having one inlet is disposed. The objects to be weighed which have been discharged from the discharge outlet 8e of the lower chute 8 are fed into the inlet of the packaging machine. The packaging machine charges into package bags the objects to be weighed which have been discharged from the combination weigher and packages them. Thus, in the present embodiment, the objects to be weighed which have been discharged from the two collecting hoppers 7a and 7b are configured to be fed into the same packaging machine inlet. The lower chute 8 may be provided in the packaging machine.

The control unit 10 includes a control means and a combination calculation means to control the operation of the entire combination weigher and to perform a combination process to determine a combination (discharge combination) made up of the weighing hoppers 4 which should discharge the objects to be weighed. In the combination process, the combination calculation is performed based on measured values (measured values of the weights of the objects to be weighed inside the weighing hoppers 4, which are obtained using the weight sensors 41) of the weighing hoppers 4 to determine one combination made up of the weighing hoppers 4 in which a combination weight value which is a total of the measured values falls within an allowable range (predetermined weight range) with respect to a target weight value and to determine it as an optimal combination. If the number of combinations in which the combination weight values fall within the allowable range with respect to the target weight value is plural, a combination in which, for example, a total measured value is closest to the target weight value (or a combination whose total measured value coincides with the target weight value, if any), i.e., a combination in which an absolute value of a difference between the total measured value and the target weight value is smallest, is determined as an optimal combination. In the embodiment 1, the optimal combination is a discharge combination. In the combination weigher, the target weight value and the allowable range with respect to the target weight value are predetermined. The allowable range is determined such that the target weight value is a lower limit value and a value larger than the target weight value is an upper limit value, for example. By way of example, when the target weight value is set to 400 g, the lower limit value of the allowable range is set to 400 g which is equal to the target weight value, and the upper limit value of the allowable range is set to 420 g which is larger than the target weight value. Alternatively, the allowable range may be determined such that a value smaller than the target weight value is set as the lower limit value and the upper limit value is not set (In this case, the upper limit value may be assumed to be infinite).

An outline of the operation of the combination weigher configured as described above will be initially described.

The objects to be weighed are supplied from the external supplying means which is not shown to the vibration feeder 2. The vibration feeder 2 feeds the objects to be weighed to the feeding hopper 3. The feeding hopper 3 feeds the objects to be weighed to the weighing hopper 4. The weight sensor 41 measures the weight of the objects to be weighed which have been fed into each weighing hopper 4, and sends the measured value to the control unit 10. Then, the above described combination process is performed to determine the optimal combination (discharge combination). The weighing hoppers 4 selected to make up of the optimal combination discharge the objects to be weighed and the feeding hoppers 3 feed the objects to be weighed to the weighing hoppers 4 which are empty. The vibration feeders 2 feed the objects to be weighed to the feeding hoppers 3 which are empty.

In present embodiment, the combination process is performed sequentially, and the weighing hoppers 4 discharge the objects to be weighed in such a manner that the discharge direction of the weighing hoppers 4 is switched for each optimal combination determined in the combination process. To be specific, the control unit 10 determines the optimal combinations determined in the combination processes, alternately as a discharge combination (first discharge combination) for discharging the objects to be weighed to the first collecting chute 6a and a discharge combination (second discharge combination) for discharging the objects to be weighed to the second collecting chute 6b, every time the combination process is performed. Therefore, the weighing hoppers 4 making up of the respective discharge combinations sequentially determined discharge the objects to be weighed alternately to the first collecting chute 6a and to the second collecting chute 6b. According to the discharge operation, the first collecting hopper 7a and the second collecting hopper 7b alternately discharge the objects to be weighed.

Subsequently, an operation of the combination weigher which takes place when the combination weigher is configured to carry out the double shift operation will be described in detail. In the double shift operation, for example, the total number of the weighing hoppers 4 may be set to fourteen, and the number of the weighing hoppers 4 which would be selected in the combination process (the number of weighing hoppers 4 which would be selected to make up of the optimal combination) may be set to four. This makes it possible to achieve weighing precision substantially as high as that in the single shift operation (will be described later) carried out under the condition in which the total number of weighing hoppers 4 is set to ten and the number of weighing hoppers 4 which would be selected in the combination process is set to four. The phrase "the number of the weighing hoppers 4 which would be selected in the combination process is set to four" means that the vibration feeders 2 and others are configured to operate so that a target feed amount of the objects to be weighed which are fed from each feeding hopper 3 to the weighing hopper 4 once becomes approximately ¼ of the target weight value.

Figure 2:
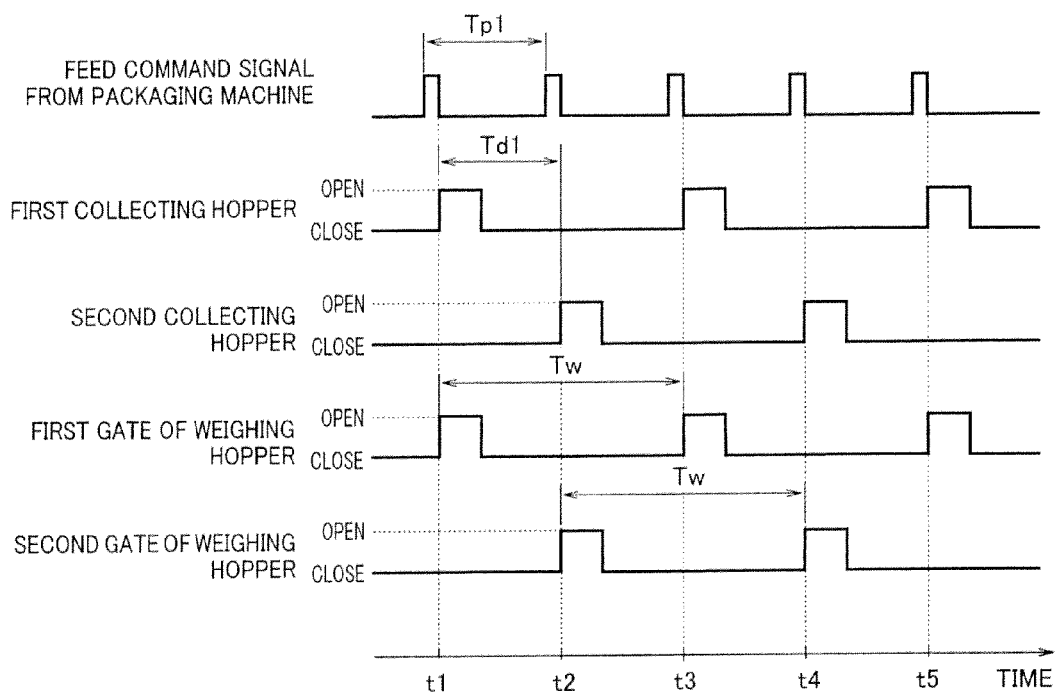
FIG. 2 is a timing chart showing a configuration in which the combination weigher of the embodiment 1 of the present invention carries out a double shift operation.

FIG. 2 is a timing chart showing the double shift operation carried out in the combination weigher according to the present embodiment.

One operation cycle time Tw is, for example, a time period taken to accomplish a procedure in which, immediately after a discharge combination is determined in a combination process performed in a previous operation cycle, weighing hoppers 4 selected to make up of the discharge combination discharge the objects to be weighed, the objects to be weighed are subsequently fed to these weighing hoppers 4 belonging to the discharge combination, time for stabilizing the associated weight sensors 41 lapses, these weight sensors 41 measure the weights of the objects to be weighed, and thereafter a combination process is performed using at least the measured values of these weighing hoppers 4 and a discharge combination is determined. One weighing cycle time is, for example, a time period taken to accomplish a procedure in which weighing hoppers 4 selected to make up of a discharge combination determined in a combination process performed in a previous operation cycle start discharging the objects to be weighed, the objects to be weighed are subsequently fed to these weighing hoppers 4 belonging to the discharge combination, time for stabilizing the associated weight sensors 41 lapses, these weight sensors 41 measure the weights of the objects to be weighed, and thereafter a combination process is performed using at least the measured values of these weighing hoppers 4 and a discharge combination is determined.

Therefore, one weighing cycle time is equal to one operation cycle time Tw in a case where an allowance time, a wait time, etc, which lapses from when a discharge combination is determined in a combination process performed, until weighing hoppers 4 selected to make up of the discharge combination start discharging the objects to be weighed are zero. Since the one operation cycle time Tw is desirably set equal to one weighing cycle time to enable the high-speed operation, the one operation cycle time Tw is set equal or substantially equal to one weighing cycle time in the example shown in FIG. 2.

The double shift operation in the present embodiment is carried out in such a manner that a combination process is performed once in every Tw/2 time to determine as the first or second discharge combination the optimal combination determined in the combination process, and weighing hoppers 4 belonging to the discharge combination discharge the objects to be weighed. The combination process in the double shift operation is performed in such a manner that combination calculation is performed using measured values (weight values of the objects to be weighed) of the weighing hoppers 4 holding the objects to be weighed whose weight values have been measured by the weight sensors 41, which are selected from among all the weighing hoppers 4, to thereby select one combination made up of weighing hoppers 4 in which a total measured value falls within a specified weight range and to determine it as an optimal combination, and measured values of all the weighing hoppers 4 are used in combination calculation in two successive combination processes. The optimal combinations sequentially determined by repeating the combination process once in every Tw/2 time are determined as the first and second discharge combinations alternately. The weighing hoppers 4 belonging to the discharge combinations discharge the objects to be weighed alternately to the first collecting chute 6a and to the second collecting chute 6b, and according to the discharge operation, the collecting hopper 7a and the collecting hopper 7b alternately discharge the objects to be weighed. Thereby, the objects to be weighed are fed to the packaging machine twice within one operation cycle time Tw. In this case, one discharge cycle time Td1 for the combination weigher is equal to ½ of one operation cycle time Tw. One discharge cycle time Td1 is equal to one packaging cycle time Tp1 for the packaging machine. Whereas the measured values of all the weighing hoppers 4 are used in combination calculation in two successive combination processes, the measured values of all the weighing hoppers 4 are not always used. For example, in cases where the total number of the weighing hoppers 4 is large, the measured values of all the weighing hoppers 4 are sometimes not used in two successive combination calculations, if the number of measured values used in one combination calculation is limited, that is, the number is predetermined.

Receiving, for example, a feed command signal from the packaging machine, as an input, the control unit 10 causes the first collecting hopper 7a to opens its gate to discharge the objects to be weighed to the packaging machine in response to the feed command signal (time t1). And, the control unit 10 causes the weighing hoppers 4 selected to make up of the discharge combination to open the first gates 5a based on the operation timing of the gate of the collecting hopper 7a to discharge the objects to be weighed from the weighing hoppers 4 to the first collecting chute 6a (time t1). Receiving a subsequent feed command signal as an input, the control unit 10 causes the second collecting hopper 7b to open its gate to discharge the objects to be weighed to the packaging machine in response to the feed command signal (time t2). And, the control unit 10 causes the weighing hoppers 4 selected to make up of the discharge combination to open the second gates 5b based on the operation timing of the gate of the collecting hopper 7b to discharge the objects to be weighed from the weighing hoppers 4 to the second collecting chute 6b (time t2). Then, receiving a subsequent feed command signal as an input, the control unit 10 causes the first collecting hopper 7a to open its gate to discharge the objects to be weighed to the packaging machine in response to the feed command signal, and causes the weighing hoppers 4 selected to make up of the discharge combination to open the first gates 5a to discharge the objects to be weighed from the weighing hoppers 4 to the first collecting chute 6a (time t3). Thereafter, the similar operation is repeated.

In the operation shown in FIG. 2, the objects to be weighed which have been discharged from the weighing hoppers 4 by opening the first gates 5a at time t1 are gathered to and held in the first collecting hopper 7a before time t3, and the collecting hopper 7a opens its gate to discharge the objects to be weighed to the packaging machine at time t3. Likewise, the objects to be weighed which have been discharged from the weighing hoppers 4 by opening the second gates 5b at time t2 are gathered to and held in the second collecting hopper 7b before time t4, and the collecting hopper 7b opens its gate to discharge the objects to be weighed to the packaging machine at time t4.

As described above, the combination process is performed, and the weighing hoppers 4 selected to make up of the discharge combinations discharge the objects to be weighed to the first collecting chute 6a and to the second collecting chute 6b alternately, and according to the discharge operation, the first collecting hopper 7a and the second collecting hopper 7b alternately discharge the objects to be weighed to the packaging machine. Whereas in the operation of FIG. 2, the opening and closing timings of the gate of the collecting hopper 7a are the same as the opening and closing timings of the first gates 5a of the weighing hoppers 4 and the opening and closing timings of the gate of the collecting hopper 7b are the same as the opening and closing timings of the second gates 5b of the weighing hoppers 4, these are merely exemplary. For example, the control unit 10 may control the opening and closing timings of the gates of the weighing hoppers 4 based on the opening and closing timings of the gates of the collecting hoppers 7a and 7b to make the opening and closing timings of the gates different.

By causing the combination weigher to perform the double shift operation as described above, the combination weigher is able to discharge the objects to be weighed to the packaging machine once in every Tw/2 time at a speed twice as high as that of the single shift operation. As a result, productivity within a specified time (the total number of times the combination weigher discharges the objects to be weighed to the packaging machine) can be improved. As a result, the combination weigher can be adapted to the packaging machine operated at a high speed.

Subsequently, an operation of the combination weigher taking place when the combination weigher is configured to carry out a triple shift operation will be described in detail. In the triple shift operation, for example, the total number of weighing hoppers 4 may be set to eighteen, and the number of the weighing hoppers 4 which would be selected in the combination process may be set to four. This makes it possible to achieve weighing precision substantially as high as that in the single shift operation carried out under the condition in which the total number of weighing hoppers 4 is set to ten and the number of weighing hoppers 4 which would be selected in the combination process is set to four.

Figure 3:
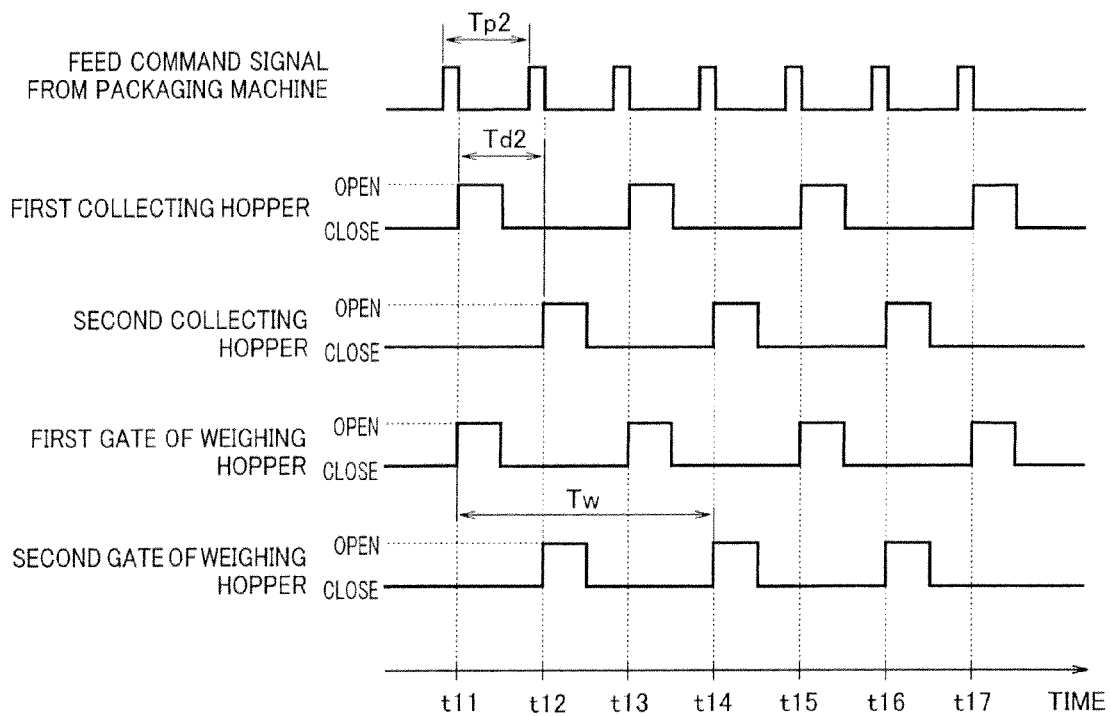
FIG. 3 is a timing chart showing a configuration in which the combination weigher of the embodiment 1 of the present invention carries out a triple shift operation.

FIG. 3 is a timing chart showing the triple shift operation carried out by the combination weigher according to the present embodiment. FIG. 3 illustrates an example in which one operation cycle time Tw is equal to one weighing cycle time, as in the example of FIG. 2.

The triple shift operation in the present embodiment is carried out in such a manner that a combination process is performed once in every Tw/3 time, the optimal combination determined in the combination process is determined as a first discharge combination or a second discharge combination, and the weighing hoppers 4 belonging to the discharge combination discharge the objects to be weighed. The combination process in the triple shift operation is performed in such a manner that combination calculation is carried out using measured values (weight values of the objects to be weighed) of the weighing hoppers 4 holding the objects to be weighed whose weight values have been measured by the weight sensors 41, which are selected from among all the weighing hoppers 4 to select one combination made up of the weighing hoppers 4 in which a total measured value falls within a specified weight range and to determine it as an optimal combination, and measured values of all the weighing hopper 4 are used in combination calculation in three successive combination processes. The optimal combinations sequentially determined by repeating the combination process once in every Tw/3 time are determined alternately as the first discharge combination and the second discharge combination, the weighing hoppers 4 belonging to the discharge combinations alternately discharge the objects to be weighed to the first collecting chute 6a and to the second collecting chute 6b, and according to the discharge operation, the first collecting hopper 7a and the second collecting hopper 7b alternately discharge the objects to be weighed. Thereby, the objects to be weighed are discharged to the packaging machine three times within one operation cycle time Tw. In this case, one discharge cycle time Td2 for the combination weigher is equal to ⅓ of one operation cycle time Tw. One discharge cycle time Td2 is equal to one packaging cycle time Tp2 of the packaging machine. Whereas the measured values of all the weighing hoppers 4 are used in combination calculation in three successive combination processes, the measured values of all the weighing hoppers 4 are not always used. For example, in cases where the total number of the weighing hoppers 4 is large, the measured values of all the combination hoppers 4 are sometimes not used in three successive combination calculations, if the number of measured values used in one combination calculation is limited, that is, the number is predetermined.

Receiving, for example, a feed command signal from the packaging machine, as an input, the control unit 10 causes the first collecting hopper 7a to open its gate to discharge the objects to be weighed to the packaging machine in response to the feed command signal (time t11). And, the control unit 10 causes the weighing hoppers 4 selected to make up of the discharge combination to open the first gates 5a based on the operation timing of the gate of the collecting hopper 7a to discharge the objects to be weighed to the first collecting chute 6a (time t11). Receiving a subsequent feed command signal as an input, the control unit 10 causes the second collecting hopper 7b to open its gate to discharge the objects to be weighed to the packaging machine in response to the feed command signal (time t12). And, the control unit 10 causes the weighing hoppers 4 selected to make up of the discharge combination to open the second gates 5b based on the operation timing of the gate of the collecting hopper 7b to discharge the objects to be weighed to the second collecting chute 6b (time t12). Then, receiving a subsequent feed command signal as an input, the control unit 10 causes the first collecting hopper 7a to open its gate to discharge the objects to be weighed to the packaging machine, and causes the weighing hoppers 4 selected to make up of the discharge combinations to open the first gates 5a to discharge the objects to be weighed to the first collecting chute 6a, in response to the feed command signal (time t13). Thereafter, the similar operation is repeated.

In the operation shown in FIG. 3, the objects to be weighed which have been discharged from the weighing hoppers 4 by opening the first gates 5a at time t11 are gathered to and held in the first collecting hopper 7a before time t13, and the collecting hopper 7a opens its gate to discharge the objects to be weighed to the packaging machine at time t13. Likewise, the objects to be weighed which have been discharged from the weighing hoppers 4 by opening the second gates 5b at time t12 are gathered to and held in the collecting hopper 7b before time t14, and the collecting hopper 7b opens its gate to discharge the objects to be weighed to the packaging machine at time t14.

As described above, the combination process is performed, and the weighing hoppers 4 selected to make up of the discharge combinations discharge the objects to be weighed to the first collecting chute 6a and to the second collecting chute 6b alternately, and according to the discharge operation, the first collecting hopper 7a and the second collecting hopper 7b alternately discharge the objects to be weighed to the packaging machine. Whereas in the operation of FIG. 3, the opening and closing timings of the gate of the collecting hopper 7a are the same as the opening and closing timings of the first gates 5a of the weighing hoppers 4 and the opening and closing timings of the gate of the collecting hopper 7b are the same as the opening and closing timings of the second gates 5b of the weighing hoppers 4, these are merely exemplary. For example, the control unit 10 may control the opening and closing timings of the gates of the weighing hoppers 4 based on the opening and closing timings of the gates of the collecting hoppers 7a and 7b to make the opening and closing timings of the gates different.

By causing the combination weigher to perform the triple shift operation as described above, the combination weigher discharges the objects to be weighed to the packaging machine once in every Tw/3 time at a speed three times as high as that of the single shift operation. As a result, productivity within a specified time can be improved, and hence the combination weigher can be adapted to the packaging machine operated at a high speed.

Whereas the configuration for carrying out the double shift operation and the configuration for carrying out the triple shift operation have been described above, the configuration for carrying out the single shift operation which is slow in speed (discharge speed) may be used, as a matter of course. In the configuration for carrying out the single shift operation, for example, the total number of weighing hoppers 4 is set to ten, the number of weighing hoppers 4 which would be selected in a combination process is set to four, the combination process is performed once within one operation cycle time Tw, the weighing hoppers 4 discharge the objects to be weighed once within one operation cycle time Tw, and the collecting hopper discharges the objects to be weighed to the packaging machine once within one operation cycle time Tw. In this case, one discharge cycle time for the combination weigher is equal to the one operation cycle time Tw. In this case, also, weighing hoppers 4 selected to make up of optimal combinations (discharge combinations) are configured to discharge the objects to be weighed alternately to the first collecting chute 6a and to the second collecting chute 6b, every time the combination process is performed.

In the present embodiment, since the weighing hoppers 4 discharge the objects to be weighed to the first collecting chute 6a and to the second collecting chute 6b alternately, a sufficient distance can be provided between a batch of the objects to be weighed which are discharged previously and a bath of the objects to be weighed which are discharged subsequently, on each of the collecting chute 6a and 6b. As a result, the combination weigher can be operated at a high speed and productivity within a specified time can be improved.

In the present embodiment, so long as all the objects to be weighed which have been discharged from the weighing hoppers 4 slide down on the collecting chute 6a or 6b in a short time, and the packaging operation of the packaging machine is not impeded, the collecting hoppers 7a and 7b may be omitted. In this case, the configuration is simplified because of the omission of the collecting hoppers, and so, control therefor is unnecessary. The control unit 10 may cause weighing hoppers 4 selected to make up of a discharge combination to discharge the objects to be weighed in response to, for example, a feed command signal from the packaging machine. The objects to be weighed which have been discharged from the weighing hoppers 4 may be discharged to the lower chute 8 from the discharge outlets 6a e and 6b e of the collecting chutes 6a and 6b.

In the present embodiment, the lower chute 8 may be omitted, and the objects to be weighed which have been discharged from the two collecting choppers 7a and 7b may be configured to feed into two different packaging machine inlets. In this case, also, the collecting hoppers 7a and 7b may be omitted as described above.

In the present embodiment, since the two collecting chutes 6a and 6b and the weighing hoppers 4 capable of discharging the objects to be weighed to the collecting chutes 6a and 6b, respectively, are provided, the objects to be weighed can be easily fed to the two packaging machine inlets. Therefore, the combination weigher can be easily adapted to two packaging machines each having one inlet for the objects to be weighed or to one twin-type packaging machine having two inlets for the objects to be weighed.

Whereas in the present embodiment, one weighing unit A is provided, a plurality of weighing units similar to the weighing unit A may be provided. Each weighing unit A consists of components obtained by excluding the lower chute 8 and the control unit 10 from the combination weigher shown in FIG. 1. By way of example, FIGS. 4 and 5 are plan views each showing arrangement of two weighing units in the configuration in which the two weighing units are provided.

In the configuration shown in FIGS. 4 and 5, a first weighing unit A1 and a second weighing unit A2, each of which has a configuration similar to that of the weighing unit A of FIG. 1, and the lower chute 8 is disposed below each of the weighing units A1 and A2. As in the weighing unit A of FIG. 1, each of the weighing units A1 and A2 includes the drive unit area 1, the vibration feeders 2, the feeding hoppers 3, and others, although not shown. The vibration feeders 2 and others may be disposed suitably according to the locations of the associated feeding hoppers 3 located above the weighing hoppers 4. The control unit 10 (see FIG. 1(b)) performs combination process for each of the weighing units A1 and A2 as in the weighing unit A, and executes control to cause each of the weighing units A1 and A2 to operate as in the weighing unit A.

Below the lower chutes 8 disposed to respectively correspond to the weighing units A1 and A2, the packaging machine inlets into which the objects to be weighed are fed are disposed. Therefore, below the combination weigher, for example, two packaging machines each having one inlet for the objects to be weighed or one twin-type packaging machine are/is disposed. The objects to be weighed which have been discharged from the discharge outlets 8e of the two lower chutes 8 are fed into different packaging machine inlets (first and second packaging machine inlets) and then the packaging machine charges the objects to be weighed into package bags and packages them.

Figure 4:
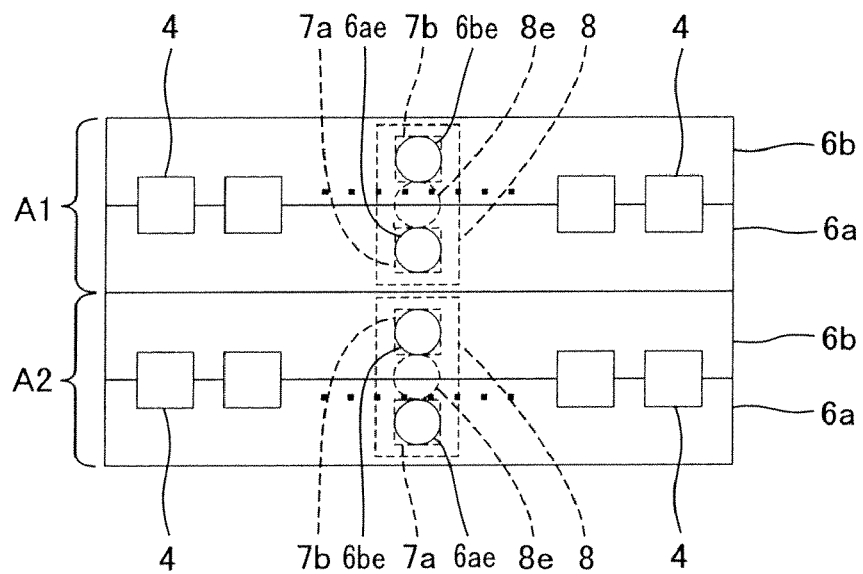
FIG. 4 is a plan view showing an example of arrangement of two weighing units in a configuration in which the two weighing units are provided in the embodiment 1 of the present invention.
Figure 5:
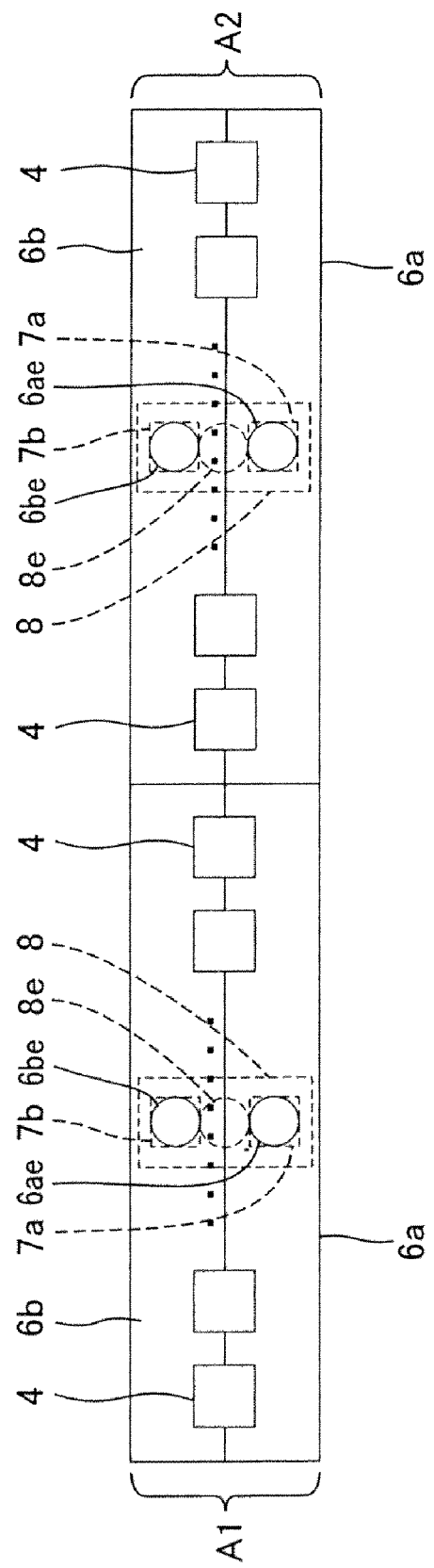
FIG. 5 is a plan view showing an example of arrangement of two weighing units in a configuration in which the two weighing units are provided in the embodiment 1 of the present invention.

In the configurations shown in FIGS. 4 and 5, the objects to be weighed which have been discharged from the collecting hopper 7a or 7b in the first weighing unit A1 are fed into the first packaging machine inlet through the lower chute 8, while the objects to be weighed which have been discharged from the collecting hopper 7a or 7b in the second weighing unit A2 are fed into the second packaging machine inlet through the lower chute 8. In this case, also, the collecting hoppers 7a and 7b may be omitted provided that the packaging operation or the like of the packaging machine is not impeded, as described above.

By providing the plurality of weighing units as in the configurations shown in FIGS. 4 and 5, a productivity within a specified time can be improved, and hence the combination weigher can be adapted to a larger number of packaging machines.

Furthermore, in the configurations shown in FIGS. 4 and 5, the lower chute 8 may be omitted, and the objects to be weighed which have been discharged from the two collecting hoppers 7a and 7b may be fed into the two different packaging machine inlets. In this case, the combination weigher can be easily adapted to four packaging machines, two twin-type packaging machines, or a packaging machine having four inlets. In this case, also, the collecting hoppers 7a and 7b may be omitted as described above.

Embodiment 2

A combination weigher according to an embodiment 2 of the present invention is configured such that the lower chute 8 is omitted from the combination weigher shown in FIG. 1. The embodiment 2 will be described with reference to FIG. 1. The configuration already described in the embodiment 1 will not be further described. The embodiment 2 is different from the embodiment 1 in the combination process of the control unit 10 and the operation timings.

Below the collecting hoppers 7a and 7b of the combination weigher of the present embodiment, two packaging machines or a twin-type packaging machine having two inlets for the objects to be weighed are disposed. The objects to be weighed which have been discharged from the collecting hopper 7a or 7b are fed into the associated packaging machine inlet (first or second packaging machine inlet), and are packaged by the packaging machine. Thus, in the present embodiment, the objects to be weighed which have been discharged from the collecting hopper 7a are fed into the first packaging machine inlet, while the objects to be weighed which have been discharged from the collecting hopper 7b are fed into the second packaging machine inlet.

The control unit 10 includes a control means and a combination calculation means to control the operation of the entire combination weigher and to perform a combination process to determine a combination made up of weighing hoppers 4 which should discharge the objects to be weighed. In the combination process, the combination calculation is performed based on measured values (measured values of weights of the objects to be weighed inside the weighing hoppers 4, which are obtained using the weight sensors 41) of the weighing hoppers 4 to determine two combinations each of which is made up of the weighing hoppers 4 and in which a combination weight value which is total measured value falls within an allowable range (specified weight range) with respect to a target weight value and to determine them as discharge combinations. This combination process will be described in detail later.

An outline of the operation of the combination weigher configured as described above will be first described.

The objects to be weighed are supplied from the external supplying means which is not shown to the vibration feeder 2. The vibration feeder 2 feeds the objects to be weighed to the feeding hopper 3. The feeding hopper 3 feeds the objects to be weighed to the weighing hopper 4. The weight sensor 41 measures the weight of the objects to be weighed which have been fed into the weighing hopper 4, and sends the measured value to the control unit 10. Then, the control unit 10 performs the combination process to determine two discharge combinations simultaneously. The weighing hoppers 4 selected to make up of the two discharge combinations discharge the objects to be weighed simultaneously. The feeding hoppers 3 feed the objects to be weighed to the weighing hoppers 4 which are empty. The vibration feeders 2 feed the objects to be weighed to the feeding hoppers 3 which are empty.

In the above configuration, the weighing hoppers 4 making up of the two discharge combinations determined simultaneously in the combination process are caused to discharge the objects to be weighed in different directions. To be specific, the weighing hoppers 4 belonging to one of the two discharge combinations discharge the objects to be weighed to the first collecting chute 6a, and at the same time, the weighing hoppers 4 belonging to the other discharge combination discharge the objects to be weighed to the second collecting chute 6b. Also, the first collecting hopper 7a and the second collecting hopper 7b discharge the objects to be weighed simultaneously.

Figure 6:
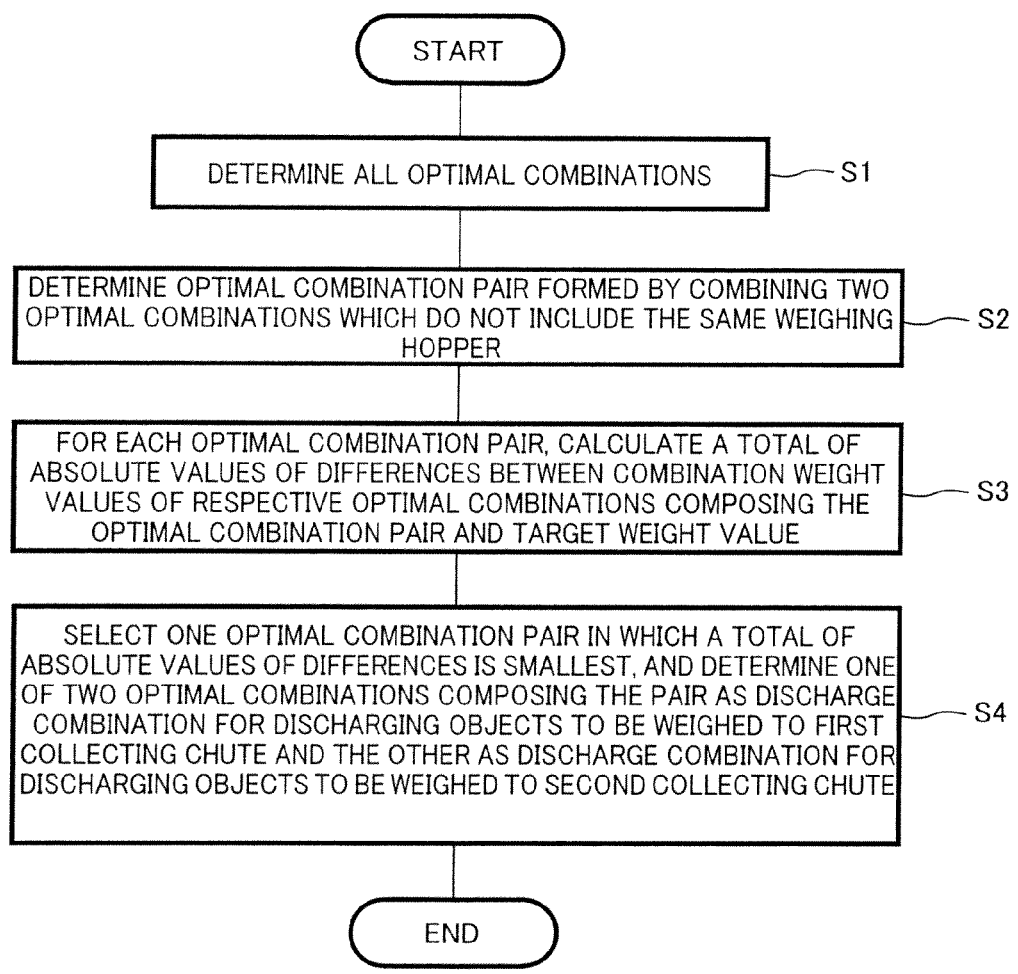
FIG. 6 is a flowchart showing a procedure of a first combination process in a combination weigher according to an embodiment 2 of the present invention.

Subsequently, the combination process in the present embodiment will be described in detail. FIG. 6 is a flowchart showing the combination process in the present embodiment.

In step S1, combination calculation is performed using measured values (weight values of the objects to be weighed) of weighing hoppers 4 holding the objects to be weighed whose weight values have been measured by the weight sensors 41 to determine all combinations in which combination weight values which are total measured values fall within an allowable range with respect to a target weight value and to determine them as optimal combinations.

In step S2, an optimal combination pair formed by combining two optimal combinations which do not include the same weighing hopper 4 is determined.

In step S3, for each optimal combination pair, absolute values of differences between combination weight values of respective optimal combinations forming the optimal combination pair and the target weight value are calculated, and a total of the absolute values of the differences is calculated. The absolute value of the difference between the combination weight value and the target weight value is an absolute value of a value obtained by subtracting the target weight value from the combination weight value, or an absolute value of a value obtained by subtracting the combination weight value from the target weight value, and is zero or a positive value.

In step S4, one optimal combination pair in which the total of the absolute values of the differences calculated in step S3 is smallest is selected, one of the two optimal combinations forming the selected pair is determined as a discharge combination (first discharge combination) for discharging the objects to be weighed to the first collecting chute 6a, and the other optimal combination is determined as a discharge combination (second discharge combination) for discharging the objects to be weighed to the second collecting chute 6b. A determination method of the first discharge combination and the second discharge combination are predetermined and any method may be used. For example, serial numbers may be assigned to the weighing hoppers 4, an optimal combination including a weighing hopper 4 with a smallest number may be determined as the first discharge combination, and the other optimal combination may be determined as the second discharge combination, or vice versa. Alternatively, the first and second optimal combinations may be determined according to the magnitude of the combination weight value. For example, an optimal combination with a larger combination weight value may be determined as the first discharge combination and an optimal combination with a smaller combination weight value may be determined as the second discharge combination, or vice versa. In a further alternative, the optimal combination with the larger combination weight value and the optimal combination with the smaller combination weight value may be alternately determined as the first and second discharge combinations, every time combination process is performed.

Whereas in steps S3 and S4, for each optimal combination pair, the total of the absolute values of the differences between the combination weight values of the respective optimal combinations and the target weight value is calculated, and one optimal combination pair in which the total of the absolute values of the differences is smallest is selected to determine the two discharge combinations, the total of squares of the differences between the combination weight values of the respective optimal combinations and the target weight value, may be calculated, and an optimal combination pair in which the total of the squares of the differences is smallest may be selected to determine it as two discharge combinations, for each optimal combination pair. In either case, the same outcome is obtained.

As described above, two discharge combinations are determined in one combination process.

Figure 7:
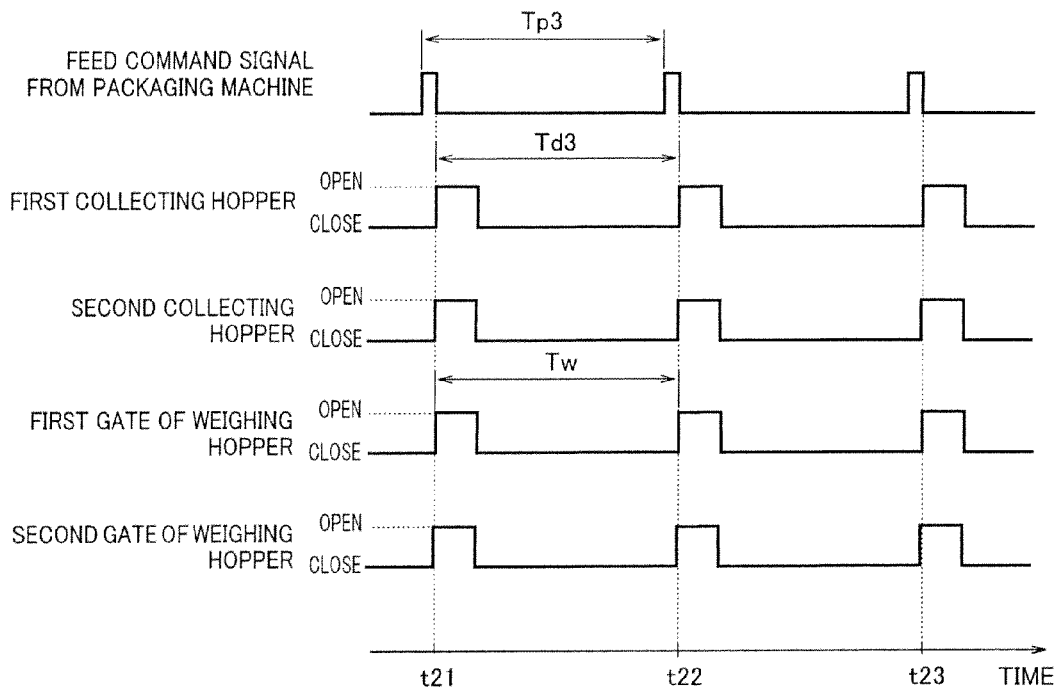
FIG. 7 is a timing chart showing a first operation example of the combination weigher according to the embodiment 2 of the present invention.

FIG. 7 is a timing chart showing a first operation example of the combination weigher of the present embodiment. As in the example of FIG. 2, the example in FIG. 7 illustrates that one cycle time Tw is equal to one weighing cycle time. It should be noted that two discharge combinations are determined in one combination process and discharge the objects to be weighed simultaneously.

In the first operation example of the present embodiment, a combination process is performed to determine two discharge combinations simultaneously once in every Tw time and weighing hoppers 4 making up of the two discharge combinations determined in the combination process discharge the objects to be weighed simultaneously once in every Tw time. In addition, the collecting hopper 7a and the collecting hopper 7b discharge the objects to be weighed simultaneously once in every Tw time. Thereby, the objects to be weighed belonging to the two discharge combinations are fed into the packaging machine within one operation cycle time Tw. In this case, one discharge cycle time Td3 of the combination weigher is equal to one operation cycle time Tw. Also, the one discharge cycle time Td3 is equal to one packaging cycle time Tp3 of the packaging machine. In this case, by configuring the setting so that the total number of weighing hoppers is set to fourteen, and the number of weighing hoppers 4 which would be selected to make up of one optimal combination is set to four, as in the double shift operation of the embodiment 1, for example, desired combination weighing precision is achieved.

Receiving, for example, a feed command signal from the packaging machine, as an input, the control unit 10 causes the first collecting hopper 7a and the second collecting hopper 7b to open their gates simultaneously to discharge the objects to be weighed to the packaging machine, in response to the feed command signal (time t21). And, the control unit 10 causes the weighing hoppers 4 selected to make up of one of the discharge combinations to open the first gates 5a based on the operation timings of the gates of the collecting hoppers 7a and 7b to discharge the objects to be weighed to the first collecting chute 6a and, at the same time, causes the weighing hoppers 4 selected to make up of the other discharge combination to open the second gates 5b to discharge the objects to be weighed to the second collecting chute 6b (time t21). The above operation is repeated every time the feed command signal is received as the input (time t22, time t23).

In the operation shown in FIG. 7, the objects to be weighed which have been discharged from the weighing hoppers 4 by opening the first gates 5a at time t21 are gathered to and held in the first collecting hopper 7a before time t22, and the collecting hopper 7a opens its gate to discharge the objects to be weighed to the packaging machine at time t22. Likewise, the objects to be weighed which have been discharged from the weighing hoppers 4 by opening the second gates 5b at time t21 are gathered to and held in the second collecting hopper 7b before time t22, and the collecting hopper 7b opens its gate to discharge the objects to be weighed to the packaging machine at time t22.

Whereas in the operation of FIG. 7, the opening and closing timings of the gates of the collecting hoppers 7a and 7b are the same as the opening and closing timings of the first gates 5a and the second gates 5b of the weighing hoppers 4, these are merely exemplary. For example, the control unit 10 may control the opening and closing timings of the first gates 5a and the second gates 5b of the weighing hoppers 4 based on the opening and closing timings of the gates of the collecting hoppers 7a and 7b to make the opening and closing timings of the gates different between the collecting hoppers 7a and 7b and the weighing hoppers 4.

By causing the combination weigher to operate in the manner as described above, the objects to be weighed are discharged to each of the two packaging machine inlets once in every operation cycle time Tw. As a result, a productivity (total number of times the combination weigher discharges the objects to be weighed to the packaging machine) within a specified time period can be improved.

Figure 8:
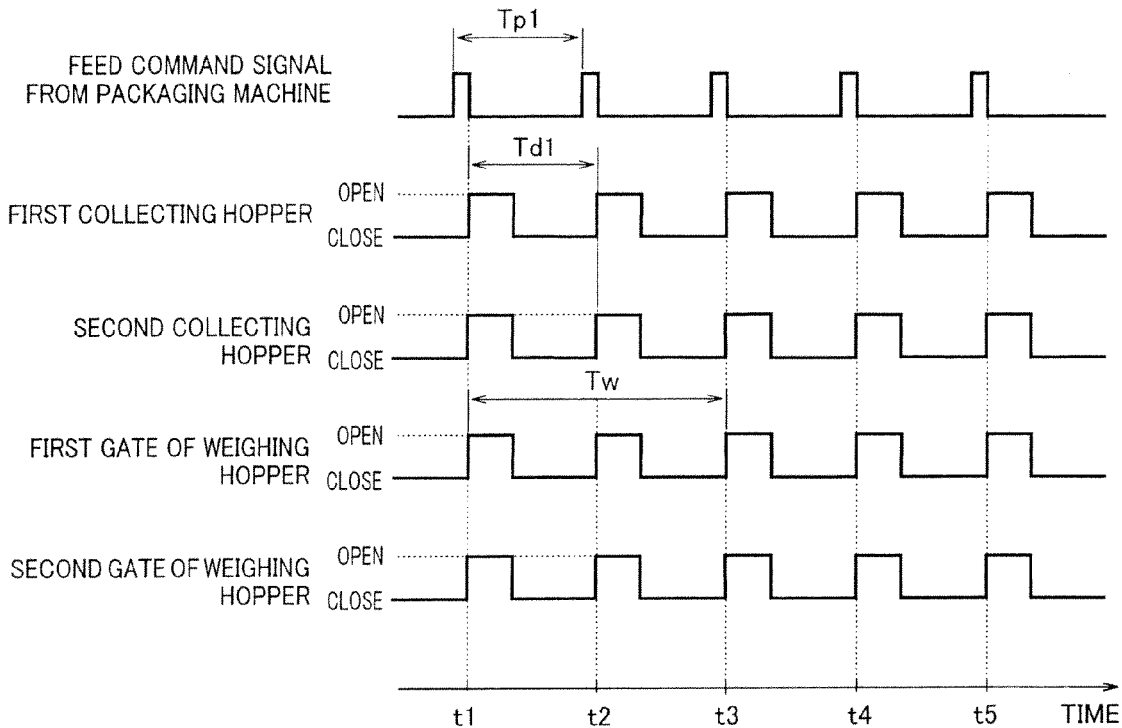
FIG. 8 is a timing chart showing a second operation example of the combination weigher according to the embodiment 2 of the present invention.

FIG. 8 is a timing chart showing a second operation example of the combination weigher of the present embodiment. In the example illustrated in FIG. 8, as in the example in FIG. 2, one operation cycle time Tw is equal to one weighing cycle time. It should be noted that two discharge combinations are determined in one combination process and discharge the objects to be weighed simultaneously.

In the second operation example of the present embodiment, combination process is performed to determine two discharge combinations simultaneously once in every Tw/2 time and weighing hoppers 4 making up of the two discharge combinations determined in the combination process discharge the objects to be weighed simultaneously once in every Tw/2 time. In addition, the collecting hopper 7a and the collecting hopper 7b discharge the objects to be weighed simultaneously once in every Tw/2 time. Thereby, the objects to be weighed belonging to the two discharge combinations are fed into the packaging machine twice within one operation cycle time Tw. In this case, one discharge cycle time Td1 for the combination weigher is equal to ½ of one operation cycle time Tw. Also, the one discharge cycle time Td1 is equal to one packaging cycle time Tp1 of the packaging machine. In this case, by configuring the setting so that the total number of weighing hoppers 4 is set to twenty two, and the number of weighing hoppers 4 which would be selected to make up of one optimal combination is set to four, desired combination weighing precision is achieved.

Receiving, for example, a feed command signal from the packaging machine, as an input, the control unit 10 causes the first collecting hopper 7a and the second collecting hopper 7b to open their gates simultaneously to discharge the objects to be weighed to the packaging machine, in response to the feed command signal (time t1). And, the control unit 10 causes the weighing hoppers 4 selected to make up of one of the discharge combinations to open the first gates 5a based on the operation timings of the gates of the collecting hoppers 7a and 7b to discharge the objects to be weighed to the first collecting chute 6a and, at the same time, causes the weighing hoppers 4 selected to make up of the other discharge combination to open the second gates 5b to discharge the objects to be weighed to the second collecting chute 6b (time t1). The above operation is repeated every time the feed command signal is received as the input (time t2, time t3, . . . ).

In the operation shown in FIG. 8, the objects to be weighed which have been discharged from the weighing hoppers 4 by opening the first gates 5a at time t1 are gathered to and held in the first collecting hopper 7a before time t2, and the collecting hopper 7a opens its gate to discharge the objects to be weighed to the packaging machine at time t2. Likewise, the objects to be weighed which have been discharged from the weighing hoppers 4 by opening the second gates 5b at time t1 are gathered to and held in the second collecting hopper 7b before time t2, and the collecting hopper 7b opens its gate to discharge the objects to be weighed to the packaging machine at time t2.

Whereas in the operation of FIG. 8, the opening and closing timings of the gates of the collecting hoppers 7a and 7b are the same as the opening and closing timings of the first gates 5a and the second gates 5b of the weighing hoppers 4, these are merely exemplary. For example, the control unit 10 may control the opening and closing timings of the first gates 5a and the second gates 5b of the weighing hoppers 4 based on the opening and closing timings of the gates of the collecting hoppers 7a and 7b to make the opening and closing timings of the gates different between the collecting hoppers 7a and 7b and the weighing hoppers 4.

By causing the combination weigher to operate in the manner as described above, the objects to be weighed are discharged to each of the two packaging machine inlets once in every Tw/2 time. As a result, a productivity within a specified time period can be further improved, and hence, the combination weigher can be adapted to, for example, a twin-type packaging machine operated at a high speed.

Also, the combination process may be performed once in every Tw/3 time to determine two discharge combinations simultaneously. And, the weighing hoppers 4 making up of the two discharge combinations determined in the combination process may discharge the objects to be weighed simultaneously once in every Tw/3 time. Correspondingly, the collecting hopper 7a and the collecting hopper 7b may be configured to discharge the objects to be weighed simultaneously once in every Tw/3 time. In this case, the objects to be weighed are discharged to each of the two packaging machine inlets once in every Tw/3 time. As a result, a productivity within a specified time period can be further improved, and hence, the combination weigher can be adapted to, for example, the twin-type packaging machine operated at a higher speed.

In the present embodiment, since two discharge combinations are determined in one combination process, and the objects to be weighed belonging to the two discharge combinations are discharged simultaneously, a productivity within a specified time can be improved. In addition, since the objects to be weighed belonging to one of the two discharge combinations are discharged to the first collecting chute 6a, and the objects to be weighed belonging to the other discharge combination are discharged to the second collecting chute 6b, a sufficient distance can be provided between a batch of the objects to be weighed which are discharged previously and a batch of the objects to be weighed which are discharged subsequently, on each of the collecting chutes 6a and 6b, making it easy to carry out a high-speed operation. Furthermore, since the two discharge combinations are determined simultaneously, the weights of the objects to be weighed of a larger number of weighing hoppers 4 can be used in the combination process for determining the two discharge combinations. As a result, combination weighing precision for the objects to be weighed which are discharged can be improved as a whole.

The combination process (first combination process) shown in the flowchart of FIG. 6 may be replaced by a second combination process or a third combination process as described below.

Figure 9:
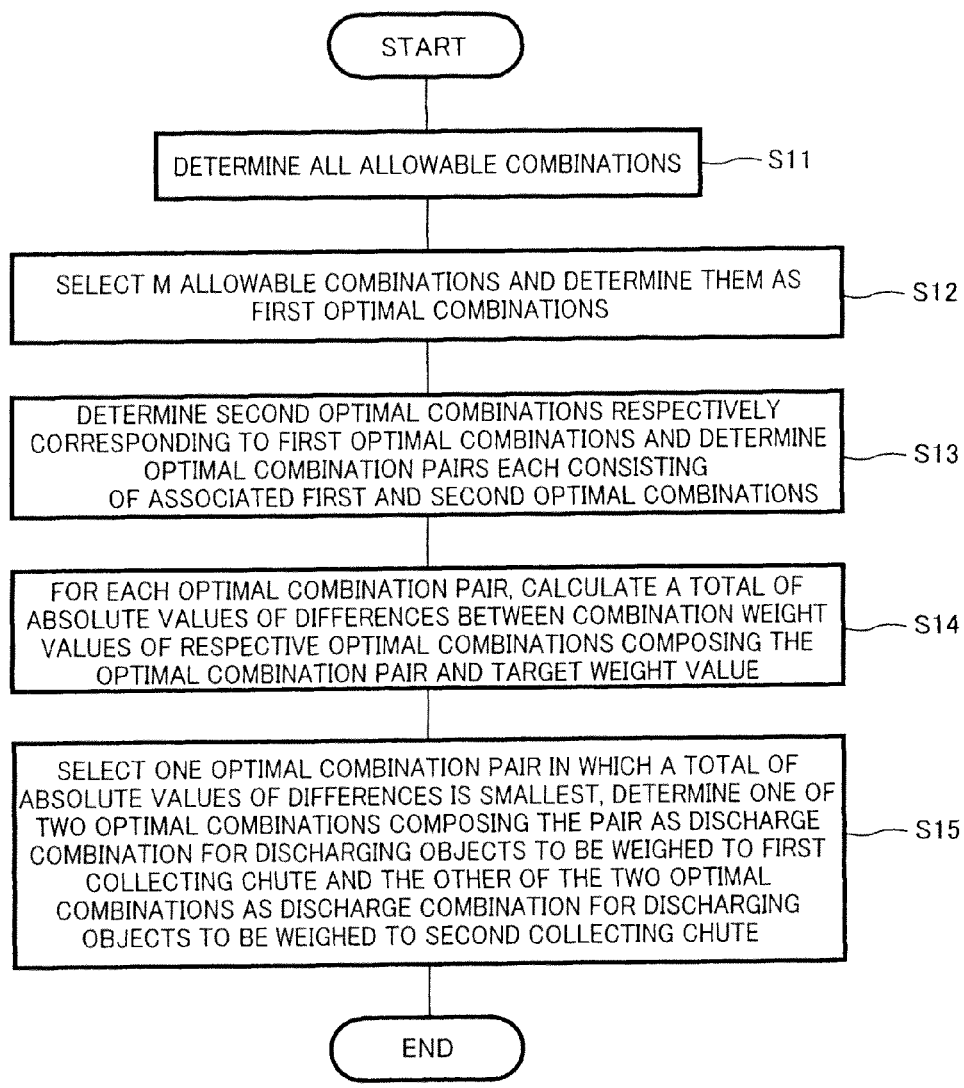
FIG. 9 is a flowchart showing a procedure of a second combination process in the combination weigher according to the embodiment 2 of the present invention.

First, the second combination process will be described. FIG. 9 is a flowchart showing the second combination process of the present embodiment.

In step S11, combination calculation is performed using measured values (weight values of the objects to be weighed) of weighing hoppers 4 holding the objects to be weighed whose weight values have been measured by the associated weight sensors 41 to determine as allowable combinations, all combinations in which combination weight values which are total measured values fall within an allowable range with respect to a target weight value. The process in step S11 is identical to the process of step S1 in FIG. 6, and the optimal combination determined in step S1 corresponds to the allowable combination determined in step S11.

In step S12, specified number m (m: plural number), for example, ten allowable combinations are selected from among all the allowable combinations, by giving priority to allowable combinations in which absolute values of differences between combination weight values and the target weight value are smaller, and the selected allowable combinations are determined as first optimal combinations.

In step S13, one allowable combination in which an absolute value of a difference between a combination weight value and the target weight value is smallest is selected from among allowable combinations made up of weighing hoppers 4 other than weighing hoppers 4 belonging to one arbitrary first optimal combination and is determined as a second optimal combination belonging to the one arbitrary first optimal combination. In the same manner, second optimal combinations respectively corresponding to the m first optimal combinations are determined. In this manner, second optimal combinations respectively corresponding to the m first optimal combinations are determined and m optimal combination pairs each consisting of the associated first and second optimal combinations are determined.

In step S14, for each of the optimal combination pairs, absolute values of differences between combination weight values of the first and second optimal combinations composing the optimal combination pair and the target weight value are calculated and a total of the absolute values of the differences is calculated.

In step S15, one optimal combination pair in which the total of the absolute values of the differences calculated in step S14 is smallest is selected, and one of the two optimal combinations composing the pair is determined as the discharge combination (first discharge combination) for discharging the objects to be weighed to the first collecting chute 6a, and the other of the two optimal combinations is determined as the discharge combination (second discharge combination) for discharging the objects to be weighed to the second collecting chute 6b. A determination method of the first and second discharge combinations is predetermined, and any method may be employed. For example, the first optimal combination may be determined as the first discharge combination and the second optimal combination may be determined as the second discharge combination, or vise versa. Alternatively, serial numbers may be assigned to the weighing hoppers 4, an optimal combination including a weighing hopper 4 with a smallest number may be determined as the first discharge combination, and the other optimal combination may be determined as the second discharge combination, or vice versa. Alternatively, the first and second optimal combinations may be determined according to the magnitude of the combination weight values. For example, an optimal combination with a larger combination weight value may be determined as the first discharge combination and an optimal combination with a smaller combination weight value may be determined as the second discharge combination, or vice versa. In a further alternative, the optimal combination with the larger combination weight value and the optimal combination with the smaller combination weight value may be alternately determined as the first and second discharge combinations, every time combination process is performed.

Whereas in steps S14 and S15, for each optimal combination pair, the total of the absolute values of the differences between the combination weight values of the respective optimal combinations and the target weight value is calculated, and the optimal combination pair in which the total of the absolute values of the differences is smallest is selected to determine the two discharge combinations, the total of squares of the differences between the combination weight values of the respective optimal combinations and the target weight value, may be calculated, and an optimal combination pair in which a total of the squares of the differences is smallest may be selected to determine it as two discharge combinations, for each optimal combination pair. In either case, the same outcome is obtained.

Subsequently, the third combination process will be described.

Initially, combination calculation is performed using measured values (weight values of the objects to be weighed) of weighing hoppers 4 holding the objects to be weighed whose weight values have been measured by the associated weight sensors 41 to determine all combinations in which combination weight values which are total measured values fall within an allowable range with respect to a target weight value and to determine them as allowable combinations. Then, one allowable combination in which an absolute value of a difference between a combination weight value and the target weight value is smallest is selected from among all the allowable combinations, and is determined as a first optimal discharge combination.

Subsequently, one allowable combination in which an absolute value of a difference between a combination weight value and the target weight value is smallest is selected from among allowable combinations made up of weighing hoppers 4 other than the weighing hoppers 4 belonging to the first optimal discharge combination and is determined as a second optimal combination. One of the first optimal combination and the second optimal combination is determined as the discharge combination (first discharge combination) for discharging the objects to be weighed to the first collecting chute 6a, while the other is determined as the discharge combination (second discharge combination) for discharging the objects to be weighed to the second collecting chute 6b. A determination method of the first discharge combination and the second discharge combination are predetermined as in the case of the second combination process.

Subsequently, it is assumed that the total number of weighing hoppers 4 is fourteen, and the number of weighing hoppers 4 to be selected to form one discharge combination in the combination process is four, in the configuration in which the lower chute 8 is omitted from the configuration of FIG. 1. In this case, if the double shift operation described in the embodiment 1 is carried out, combination calculation is performed using ten measured values, and a combination in which a combination weight value falls within an allowable range with respect to a target weight value, and an absolute value of a difference between the combination weight value and the target weight value is smallest, is selected as the optimal combination (discharge combination).

In contrast, if the third combination process is performed in the configuration for the operation shown in FIG. 7 to determine two discharge combinations within one operation cycle time, as in the double shift operation, the second optimal combination is selected using ten measured values, while the first optimal combination is always selected using fourteen measured values. It is known that combination weighing precision increases as the number of measured values used in the combination calculation increases. Therefore, if the total number of weighing hoppers 4 is equal, then combination weighing precision for the objects to be weighed which are discharged, can be improved as a whole, when using the third combination process rather than using the double shift operation.

In the second combination process, a plurality of first optimal combinations are determined under an extended condition for selecting the first optimal combination in the third combination process, second optimal combinations respectively corresponding to the first optimal combinations are determined, and the combination pair consisting of associated two optimal combinations in which a total of absolute values of differences between combination weight values of associated two optimal combinations and the target weight value is smallest is selected. Therefore, combination weighing precision for the objects to be weighed which are discharged can be improved as a whole, when using the second combination process rather than using the third combination process.

In the first combination process, the optimal combination pair is formed by combining two out of all optimal combinations, and the optimal combination pair in which the total of the absolute values of the differences between the combination weight values of the two optimal combinations and the target weight value is smallest is selected. Therefore, combination weighing precision for the objects to be weighed which are discharged can be improved as a whole when using the first combination process rather than using the third combination process.

In accordance with the first, second, or third combination process, since the two discharge combinations are determined simultaneously in one combination process, combination weighing precision for the objects to be weighed which are discharged can be improved as a whole.

In addition, the calculation amount decreases in the order of the first combination process, the second combination process, and the third combination process, and time taken for the combination processes can be reduced in this order.

In the above described embodiments 1 and 2, in a case where the allowable range with respect to the target weight value is set to a range which is not smaller than the target weight value, that is, the lower limit value of the allowable range is set to a value equal to the target weight value, an absolute value of a difference between the combination weight value of the optimal combination or the allowable combination and the target weight value is equal to a value (difference) obtained by subtracting the target weight value from the combination weight value. Therefore, in this case, in step S3 in FIG. 6 and in step S14 in FIG. 9, calculating the total of the absolute values of the differences between the combination weight values of the respective optimal combinations and the target weight value is equivalent to calculating the total of the differences obtained by subtracting the target weight value from the combination weight values of the respective optimal combinations.

In a case where the lower limit value of the allowable range is set to the target weight value, the steps S3 and S4 in FIG. 6 and the steps S14 and S15 in FIG. 9 may be replaced by the operation in which a total of combination weight values of two optimal combinations forming an optimal combination pair is calculated for each optimal combination pair, one optimal combination pair in which a calculated total is smallest is selected, one of two optimal combinations forming the selected pair is determined as a discharge combination (first discharge combination) for discharging the objects to be weighed to the first collecting chute 6a, and the other is determined as a discharge combination (second discharge combination) for discharging the objects to be weighed to the second collecting chute 6b. In this case, two discharge combinations identical to the outcome resulting from the steps S3 and S4 and the steps S14 and S15 are determined.

Whereas in the second embodiment, the objects to be weighed are fed to the two packaging machine inlets without providing the lower chute 8, the collecting hoppers 7a and 7b may be also omitted in this case, so long as all of the objects to be weighed which have been discharged from the weighing hoppers 4 slide down on the collecting chute 6a or 6b in a short time, and packaging operation of the packaging machine, and the like is not impeded. In this case, because of the omission of the collecting hoppers, a configuration becomes simple and control therefor is unnecessary. The control unit 10 may cause weighing hoppers 4 selected to make up of a discharge combination to discharge the objects to be weighed, in response to, for example, a feed command signal from a packaging machine. The objects to be weighed which have been discharged from the weighing hoppers 4 are fed to the associated one of two packaging machine inlets through the discharge outlet 6ae or 6be of the collecting chutes 6a or 6b.

In the embodiment 2, also, a plurality of weighing units similar to the weighing unit A (components obtained by excluding the lower chute 8 and the control unit 10 in FIG. 1) may be provided. For example, if two weighing units are provided, the lower chutes 8 are omitted from the configurations in FIGS. 4 and 5. The control unit 10 (see FIG. 1(*b*)) performs the combination process similar to that for the weighing unit A in the embodiment 2, for each of the weighing units A1 and A2 shown in FIGS. 4 and 5, and executes control to cause each of the weighing units A1 and A2 to perform the operation as in the weighing unit A.

Below the collecting hoppers 7a and 7b in each of the weighing units A1 and A2, packaging machine inlets into which the objects to be weighed are fed are disposed. That is, below the combination weigher, for example, four packaging machines each having one inlet for the objects to be weighed are disposed. The objects to be weighed which have been discharged from the four collecting hoppers are fed into the associated different packaging machine inlets (first to fourth packaging machine inlets). The packaging machines charge the objects to be weighed into the package bags and package them. For example, the objects to be weighed which have been discharged from the collecting hoppers 7a and 7b in the first weighing unit A1 are fed into the associated first and second packaging machine inlets, respectively, while the objects to be weighed which have been discharged from the second collecting hoppers 7a and 7b in the second weighing unit A2 are fed into the associated third and fourth packaging machine inlets, respectively. In this case, also, the collecting hoppers 7a and 7b may be omitted so long as the packaging operation of the packaging machine and the like are not impeded, as described above.

By providing the plurality of weighing units as described above, a productivity within a specified time can be further improved, and thus the combination weigher can be easily adapted to a larger number of packaging machines.

Moreover, if the control unit 10 (see FIG. 1) controls the two weighing units A1 and A2 so that the operation timings thereof are equal in the configuration in which the lower chute 8 is omitted from the configuration in FIG. 4, then the four collecting hoppers 7a and 7b arranged in straight-line shape discharge the objects to be weighed simultaneously. In this case, the control unit 10 (see FIG. 1) performs the combination process simultaneously for the two weighing units A1 and A2, and controls the two weighing units A1 and A2 to cause the weighing hoppers 4 to perform the discharge operation simultaneously and to cause the collecting hoppers 7a and 7b to perform the discharge operation simultaneously. The combination weigher (hereinafter referred to as a combination weigher W) thus configured is operable in association with a packaging machine shown in FIG. 10, for example.

Figure 10A:
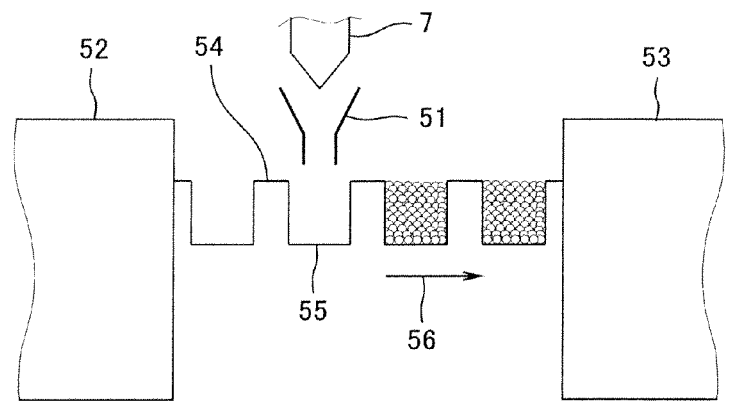
FIG. 10(a) is a cross-sectional view showing an example of a schematic configuration of a packaging machine disposed below the combination weigher including a plurality of weighing units in the embodiment 2 of the present invention.
Figure 10B:
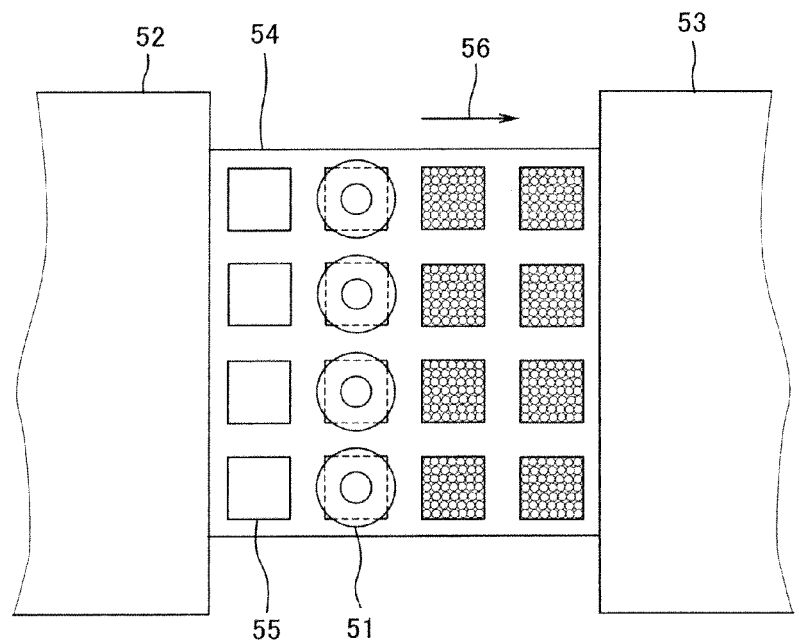
FIG. 10(b) is a schematic plan view of the packaging machine as viewed from above.

FIG. 10 is a view showing one example of a packaging machine having four packaging machine inlets. FIG. 10(a) is a cross-sectional view showing a schematic configuration of a vacuum packaging machine and FIG. 10(b) is a schematic plan view of the packaging machine as viewed from above.

In the packaging machine, funnels 51 are respectively disposed under the four collecting hoppers 7 (7a, 7b) of the combination weigher W. In this case, the funnels 51 are packaging machine inlets. It should be noted that openings of package bags or package containers manufactured or used in the packaging machine may be packaging machine inlets into which the objects to be weighed are fed, depending on the type of the packaging machine.

In the packaging machine, first, a forming part 52 suctions and heats a resin-made film drawn from a roll to form four package containers 55 sequentially. The resin-made film forming the package containers 55 is held by a conveyor means such as a belt conveyor which is not shown and is conveyed intermittently in a direction indicated by an arrow 56. Receiving, for example, a feed command signal from the packaging machine as an input, the combination weigher W discharges the objects to be weighed simultaneously from the four collecting hoppers 7. The objects to be weighed are fed to the package containers 55 through the associated funnels 51. Receiving, for example, a discharge completion signal, from the combination weigher W, and being ready for conveying the resin-made film, the packaging machine conveys subsequent four package containers 55 to under the four funnels 51 and stops. The packaging machine sends a feed command signal to the combination weigher. Thereby, the four package containers 55 are respectively fed with the objects to be weighed simultaneously, and then are conveyed to a lid sealing part 53. The lid sealing part 53 bonds a resin-made film to upper surfaces of the package containers 55 to close the openings of the package containers 55. Thereafter, a cutting part (not shown) positioned in a subsequent stage of the lid seal part 53, cuts the resin-made film for each package container 55 or each set of four package containers 55, for example.

Another example of the packaging machine adapted to the combination weigher W may be a package bag supply type packaging machine configured in such a manner that separate four package bags are conveyed to under the four collecting hoppers 7 simultaneously, the objects to be weighed which have been discharged from these collecting hoppers 7 are fed into openings of the package bags through funnels or the like, and thereafter the openings of the package bags are sealed. Still another example of the packaging machine may be configured in such a manner that one or two resin-made films is/are drawn out from a roll and is/are subjected to heat treatment and pressurization treatment so that four package bags connected to each other are manufactured simultaneously, these package bags are transported to under the four collecting hoppers 7, objects to be weighed which have been discharged from these collecting hoppers 7 are fed into openings of the package bags through funnels and the like, thereafter, the openings of the package bags are sealed, and the resin-made films are separated by cutting for each package bag.

Still another example of the packaging machine may be a packaging line configured in such a manner that each set of four resin-made package containers manufactured in advance (e.g., package containers which are formed by separating the package containers 55 in FIG. 10) are sequentially put on a belt conveyor and are transported to under the four collecting hoppers 7, and the openings of the package containers are closed by the resin-made film or the like after the combination weigher feeds the objects to be weighed to the four package containers simultaneously.

Figures 15A, 15B:
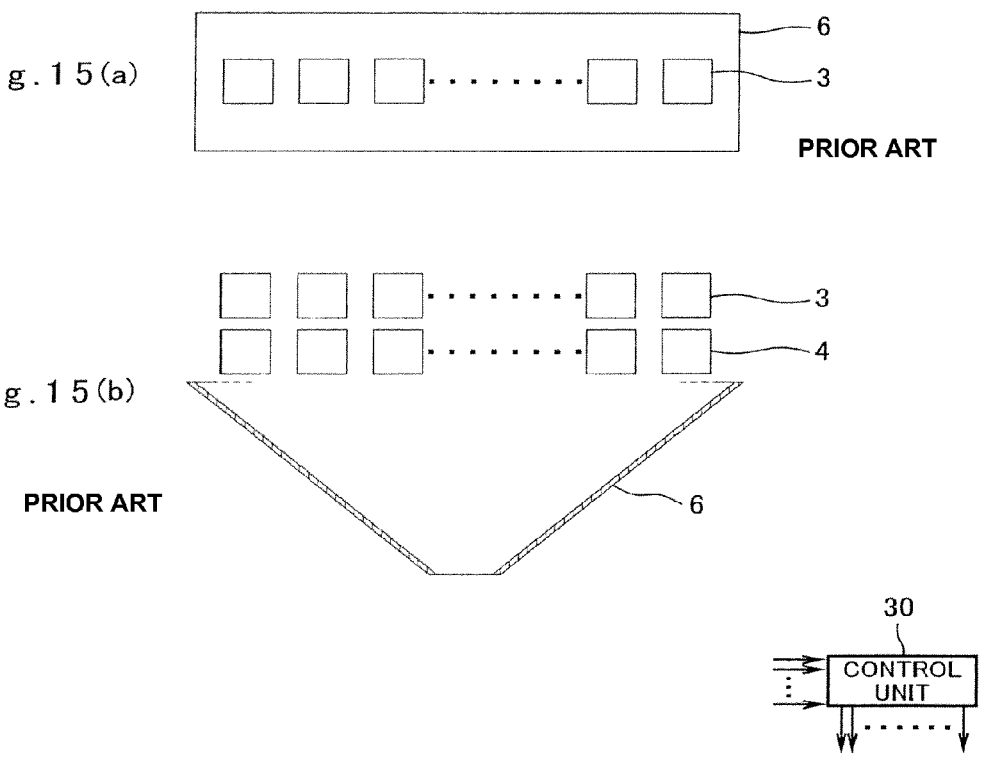
FIG. 15(a) is a schematic view of a conventional combination weigher as viewed from above and FIG. 15(b) is a schematic view of the combination weigher as viewed from the front.

In cases where the conventional combination weigher shown in, for example, FIG. 15 is used to discharge four sets of the objects to be weighed, as in the case using the combination weigher W, the following configurations (1) to (3) may be employed.

(1) Four combination weighers are configured to operate at the same operation timings and are each configured to discharge one set of objects to be weighed so that four sets of objects to be weighed are discharged simultaneously.

(2) Two combination weighers and a sorting discharge apparatus are used, and the two combination weighers are configured to operate at the same timings and carry out the double shift operation. In this case, each combination weigher discharges one set of objects to be weighed once in every ½ of one operation cycle time Tw. Therefore, two sets of objects to be weighed are discharged from the whole of the two combination weighers once in every Tw/2 time, and four sets of objects to be weighed are discharged therefrom within Tw time. In this case, the sorting discharge apparatus is required to individually receive the four sets of objects to be weighed which have been discharged within Tw time and to discharge them to the packaging machine simultaneously. For example, collecting hoppers may be provided at discharge outlets of the collecting chutes 6 (FIG. 15) of each of the two combination weighers, four discharge hoppers (first to fourth discharge hoppers) may be arranged in a straight-line shape under the two collecting hoppers, and the sorting discharge apparatus may be constituted by the two collecting hoppers and the four discharge hoppers. One of the two collecting hoppers is configured to be able to discharge the objects to be weighed to the first discharge hopper and to the second discharge hopper alternately, while the other collecting hopper is configured to be able to discharge the objects to be weighed to the third discharge hopper and to the fourth discharge hopper alternately. The four discharge hoppers are configured to discharge the objects to be weighed to the packaging machine simultaneously, when these four discharge hoppers hold the objects to be weighed.

(3) One combination weigher provided with the collecting hopper at the discharge outlet of the collecting chute 6 (FIG. 15) and one sorting apparatus are used as described above. Combination calculation is performed once in every Tw/4 time. Weighing hoppers 4 making up of a combination selected by the combination calculation discharge the objects to be weighed, and according to the discharge operation, the collecting hopper discharges the objects to be weighed (hereinafter this operation is referred to as "fourth shift operation"). In this case, one set of objects to be weighed are discharged from the combination weigher once in every Tw/4 time, and therefore four sets of objects to be weighed are discharged within Tw time. In this case, also, the sorting discharge apparatus is required to individually receive the four sets of objects to be weighed which have been discharged within Tw time and to discharge them to the packaging machine simultaneously, as in the configuration (2), although its configuration is different. To form the sorting discharge apparatus used in this case, for example, the sorting discharge apparatus described in the configuration (2) may be altered to have two stages.

In the configuration (1), because of the need for the four combination weighers, equipment cost increases. In the configuration (2), because of the need for the two combination weighers and the expensive sorting discharge apparatus, equipment cost increases. In the configuration (3), because of the need for the sorting discharge apparatus which has a more complex structure and is more expensive than in the configuration (2), equipment cost increases. Furthermore, the double shift operation in the configuration (2) and the fourth shift operation in the configuration (4) may arise a problem that, since each combination weigher has only one collecting chute 6 (FIG. 15), a sufficient distance cannot be provided between a batch of the objects to be weighed which are discharged from the weighing hoppers 4 selected in a previous combination and a batch of the objects to be weighed which are discharged from the weighing hoppers 4 selected in a subsequent combination, on the collecting chute 6, depending on characteristics of the objects to be weighed, making high-speed operation difficult.

In contrast to these configurations, the combination weigher W is able to operate at a high speed irrespective of characteristics of almost all kinds of the objects to be weighed and without substantially increasing equipment cost.

The above described combination weighers of the embodiments 1 and 2 are straight-line-shaped combination weighers each including weighing units in which the weighing hoppers 4 are arranged in the straight-line shape. On the other hand, there is a circular combination weigher comprising weighing hoppers which are arranged in a circle shape, and are able to discharge the objects to be weighed in an inward direction of the circle shape in which the weighing hoppers are arranged or in an outward direction of the circle shape, collecting chutes including an inner chute and an outer chute disposed to cross each other, the inner chute being configured to gather the objects to be weighed which have been discharged in the inward direction from the weighing hoppers and to discharge them and the outer chute being configured to gather the objects to be weighed which have been discharged in the outward direction from the weighing hoppers and to discharge them. In contrast to the circular combination weigher, the straight-line-shaped combination weigher in the present embodiment can make two collecting chutes 6a and 6b in the weighing unit have the same and simple shape, and therefore have a simple structure. As a result, cost can be reduced. In addition, since the objects to be weighed slides down substantially straight on the collecting chute 6a or 6b, a batch length of the objects to be weighed does not increase on the collecting chute 6a or 6b, and therefore a sufficient distance is easily provided between a batch of the objects to be weighed which are discharged previously and a batch of the objects to be weighed which are discharged subsequently, on the collecting chute 6a or 6b.

Figure 11A:
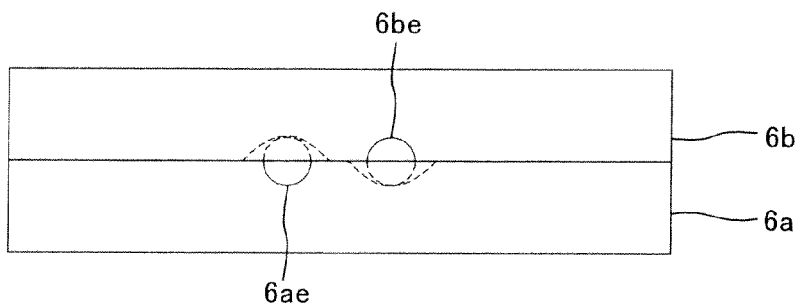
FIG. 11(a) is a schematic view showing another example of collecting chutes for use with the combination weighers of the embodiments 1 and 2 of the present invention as viewed from above.
Figure 11B:
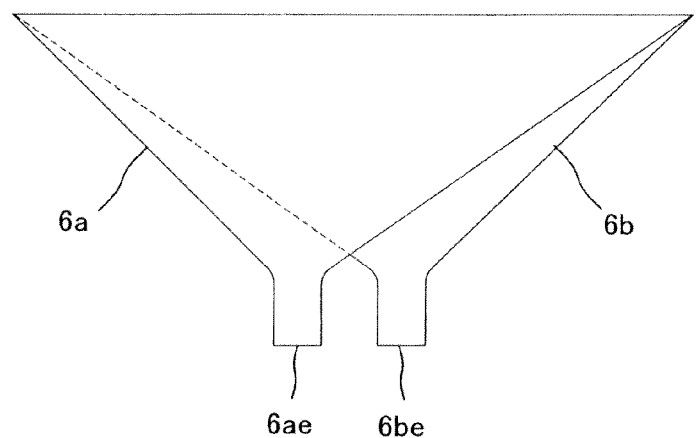
FIG. 11(b) is a schematic view of the collecting chutes as viewed from the front.

In the embodiments 1 and 2, the arrangement of the discharge outlets 6ae and 6be of the two collecting chutes 6a and 6b of the weighing units may be suitably changed (except for the configuration for operating in association with the packaging machine as shown in FIG. 10). FIG. 11 shows another example of the collecting chutes.

FIG. 11(*a*) is a schematic view of another example of collecting chutes as viewed from above, and FIG. 11(*b*) is a schematic view of the collecting chutes as viewed from the front. In this example, the two discharge outlets 6a e and 6b e are arranged in the direction perpendicular to the direction in which the collecting chutes 6a and 6b are arranged. In this case, also, the two collecting chutes 6a and 6b are made to have an identical and simple shape, as compared to the inner chute and the outer chute of the above described circular combination weigher. For example, the locations of the discharge outlets 6ae and 6be of the collecting chutes 6a and 6b may be changed depending on the locations of the packaging machines, as shown in FIGS. 11(*a*) and 11(*b*).

Embodiment 3

FIG. 12(*a*) is a schematic view of a combination weigher according to an embodiment 3 of the present invention as viewed from above, FIG. 12(*b*) is a schematic view of the combination weigher as viewed from the front, FIG. 12(*c*) is a schematic view of the combination weigher as viewed from the side; and FIG. 12(*d*) is a schematic view of another example of the combination weigher of the present embodiment as viewed from the side.

As shown in FIGS. 12(*a*), 12(*b*), and 12(*c*), the combination weigher of the present embodiment is different from the combination weigher shown in FIG. 1 in that the collecting chutes 6a and 6b and the collecting hoppers 7a and 7b in the combination weigher of FIG. 1 have been replaced by belt conveyors 21a and 21b and a separating board 22 provided therebetween. In addition, the lower chute 8 is disposed at a terminal end portion of the belt conveyors 21a and 21b to which the objects to be weighed are conveyed. Below or in a subsequent stage of the lower chute 8 of the combination weigher, one packaging machine (not shown) having one inlet is disposed and the objects to be weighed which have been discharged from the discharge outlet 8e of the lower chute 8 are fed into the packaging machine inlet, for example, as in the embodiment 1. Alternatively, the lower chute 8 may be provided in the packaging machine. As desired, ejection prevention boards may be provided at both sides of the belt conveyors 21a and 21b to extend in parallel with the separating board 22 to prevent ejection of the objects to be weighed outside the belt conveyors 21a and 21b.

The control unit 20 includes a control means and a combination calculation means to control the operation of the entire combination weigher and to perform a combination process to determine a combination (discharge combination) made up of the weighing hoppers 4 which should discharge the objects to be weighed. The control unit 20 need not control the opening and closing of the gates of the collecting hoppers 7a and 7b unlike the control unit 10 of FIG. 1, but instead controls the operation of the belt conveyers 21a and 21b. The belt conveyors 21a and 21b are driven by the associated motors which are not shown. The control unit 20 controls the operation of the belt conveyers 21a and 21b using drive circuits of the motors. In a normal operation, the belt conveyors 21a and 21b operate so as to convey the objects to be weighed which have been discharged thereto in a direction as indicated by an arrow a but may operate in a reverse direction.

In the present embodiment, the control unit 20 may perform any of the combination processes described in the embodiment 1. Therefore, every time the combination process is performed, a combination (discharge combination) of the weighing hoppers 4 for discharging the objects to be weighed onto the belt conveyor 21a, and a combination (discharge combination) of the weighing hoppers 4 for discharging the objects to be weighed onto the belt conveyor 21b are determined alternately. When the objects to be weighed are discharged from the weighing hoppers 4 belonging to the discharge combination onto the belt conveyor 21a, the control unit 20 drives the belt conveyor 21a to convey the objects to be weighed in the direction of the arrow a and to discharge them onto the lower chute 8. On the other hand, when the objects to be weighed are discharged from the weighing hoppers 4 belonging to the discharge combination onto the belt conveyor 21b, the control unit 20 drives the belt conveyor 21b to convey the objects to be weighed in the direction of the arrow a and to discharge them onto the lower chute 8. For example, driving time of the belt conveyor 21a or 21b may be preset to a time taken to convey on the belt conveyor 21a or 21b, all the objects to be weighed which have been discharged from the weighing hoppers 4, and to discharge them onto the lower chute 8. And, the belt conveyor 21a or 21b which has received the objects to be weighed may be driven for the preset driving time and may be then stopped. In view of the fact that, by performing the combination process in the embodiment 1, the objects to be weighed are discharged from the weighing hoppers 4 forming the discharge combination to the belt conveyor 21a and to the belt conveyor 21b alternately and are then supplied to one packaging machine inlet through the lower chute 8, a conveying speed or the like of the belt conveyors 21a and 21b is required to be set so that a time interval is provided between the discharge of the objects to be weighed from the belt conveyor 21a to the lower chute 8 and the discharge of the objects to be weighed from the belt conveyor 21b to the lower chute 8, in order to prevent the objects to be weighed which have been discharged from the belt conveyors 21a and 21b to the lower chute 8 from being mixed and to enable the packaging machine to perform the operation correctly. The control unit 20 drives the belt conveyor 21a or 21b based on, for example, a feed command signal from the packaging machine to cause the belt conveyor 21a or 21b to discharge the objects to be weighed to the packaging machine, and causes the weighing hoppers 4 belonging to the discharge combination to discharge the objects to be weighed onto the belt conveyor 21a or 21b which has discharged the objects to be weighed.

Figure 12A:
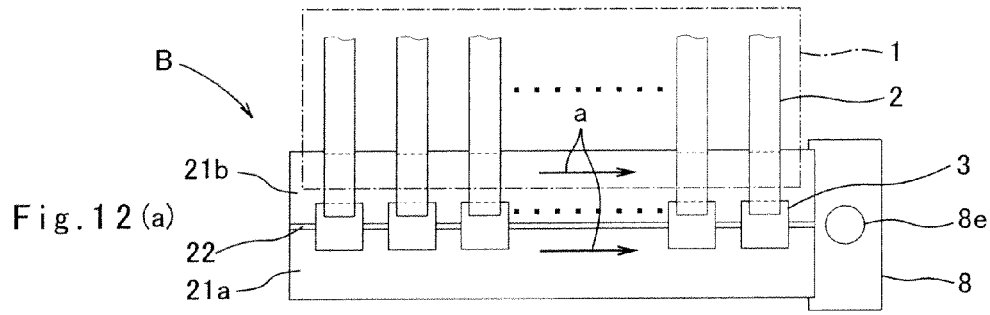
FIG. 12(a) is a schematic view of a combination weigher according to an embodiment 3 of the present invention as viewed from above.
Figure 12B:
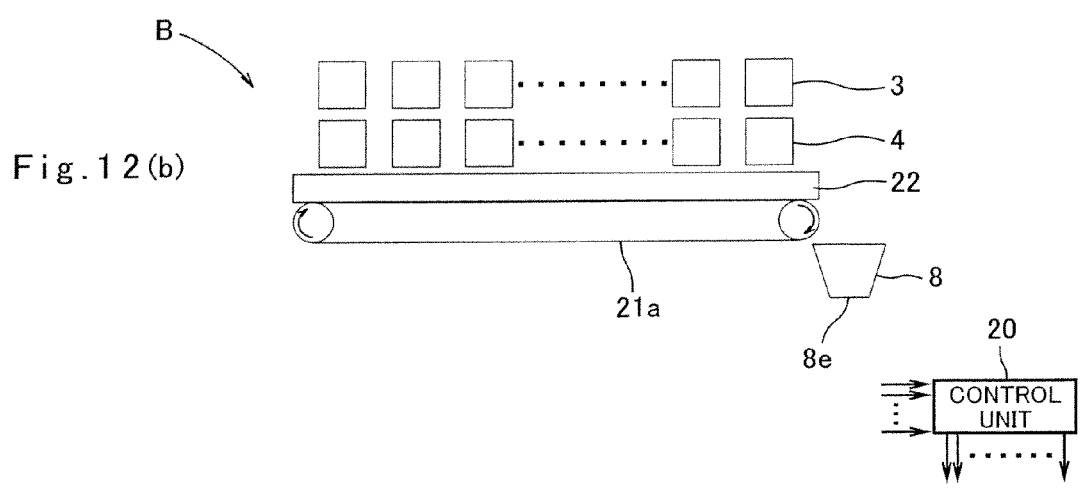
FIG. 12(b) is a schematic view of the combination weigher as viewed from the front.
Figure 12C:
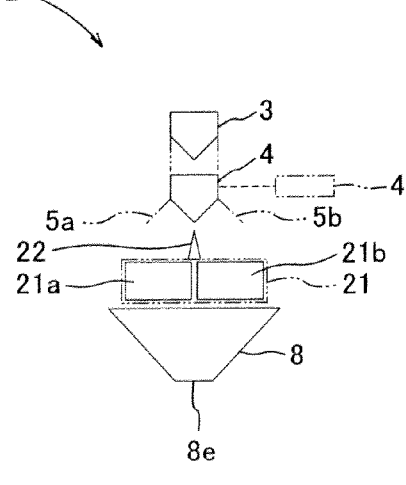
FIG. 12(c) is a schematic view of the combination weigher as viewed from the side.
Figure 12D:
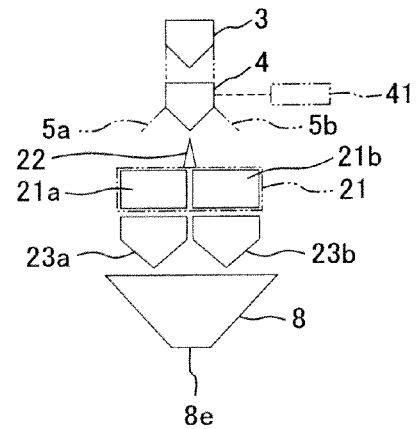
FIG. 12(d) is a schematic view of another example of the combination weigher of the embodiment 3 as viewed from the side.

As shown in FIG. 12(d), collecting hoppers 23a and 23b may be provided at conveying terminal end portions of the belt conveyor 21a and 21b, respectively, to hold the objects to be weighed which have been discharged from the belt conveyor 21a and 21b, respectively, and to discharge them, and the lower chute 8 may be disposed below the collecting hoppers 23a and 23b. In this case, the objects to be weighed which have been discharged from the belt conveyor 21a or 21b are held in the associated collecting hopper 23a or 23b and thereafter are fed into the packaging machine through the lower chute 8. For this reason, the belt conveyor 21a may start discharging the objects to be weighed before the other belt conveyor 21a completes discharging the objects to be weighed, enabling achievement of a higher-speed combination discharge operation. When the collecting hoppers 23a and 23b are provided in this way, the control unit 20 may cause the collecting hopper 23a or 23b to discharge the objects to be weighed based on, for example, the feed command signal from the packaging machine. And, the control unit 20 drives the belt conveyor 21a or 21b corresponding to the collecting hopper 23a or 23b which has discharged the objects to be weighed to discharge the objects to be weighed to the collecting hopper 23a or 23b, and causes the weighing hoppers 4 belonging to the discharge combination to discharge the objects to be weighed onto the belt conveyor 21a or 21b which has discharged the objects to be weighed.

In a case where a combination whose combination weight value falls within an allowable range with respect to a target weight value cannot be obtained even when all the weighing hoppers 4 are fed with the objects to be weighed and measured values of all the weighing hoppers 4 are used in the combination process, (i.e., combination failure occurs), a predetermined number of weighing hoppers 4 are configured to discharge the objects to be weighed to at least one of the belt conveyors 21a and 21b, and the conveying direction of the belt conveyor 11a or 21b to which the objects to be weighed have been discharged is reversed so that the objects to be weighed are discharged to a defective discharge container (not shown) disposed at an end portion of the associated belt conveyor 21a or 21b which is on the opposite side of the lower chute 8. The feeding hoppers 3 feed the objects to be weighed to the weighing hoppers 4 which have discharged the objects to be weighed, and thereafter the combination process is carried out using the measured values of the objects to be weighed which are fed to the weighing hoppers 4.

In the configuration of FIG. 12, the packaging machine inlet is disposed at the right side of the combination weigher. In a case where the packaging machine inlet is disposed at the left side of the combination weigher, the conveying direction (direction of the arrow a) in which the belt conveyors 21a and 21b convey the objects to be weighed belonging to the discharge combination may be reversed, and the lower chute 8 may be disposed at the left side.

In the present embodiment, since the weighing hoppers 4 discharge the objects to be weighed alternately to the two belt conveyors 21a and 21b, a sufficient distance can be provided between a batch of the objects to be weighed which are discharged previously and a batch of the objects to be weighed which are discharged subsequently on each of the belt conveyors 21a and 21b. This makes it easy to carry out a high-speed operation, and hence improve a productivity within a specified time.

Alternatively, in the present embodiment, the lower chute 8 may be omitted, and the objects to be weighed which are conveyed on the two belt conveyors 21a and 21b may be respectively fed into two different packaging machine inlets. Chutes may be provided at the conveying terminal end portions of the belt conveyors 21a and 21b, respectively to receive the objects to be weighed and to feed them to the associated packaging machine inlets, or otherwise the collecting hoppers 23a and 23b (see FIG. 12(d)) may be provided at the conveying terminal end portions of the belt conveyors 21a and 21b, respectively.

Since in the present embodiment, the two belt conveyors 21 and 21b and the weighing hoppers 4 capable of discharging the objects to be weighed to the associated belt conveyor 21a and 21b, are provided, the objects to be weighed can be easily fed into the two packaging machine inlets, and therefore, the combination weigher can be easily adapted to the two packaging machines or the twin-type packaging machine.

Whereas in the present embodiment, one weighing unit B is provided, a plurality of weighing units similar to the weighing unit B may be provided. Each weighing unit B consists of components obtained by excluding the lower chute 8 and the control unit 20 from the combination weigher shown in FIGS. 12(a) to 12(c). In this case, the lower chute 8 (see FIG. 12(a)) is disposed at the conveying terminal end portions of the belt conveyors 21a and 21b in each of the plurality of weighing units, and the control unit 20 (see FIG. 12(b)) performs the combination process for each of the plurality of weighing units as in the weighing unit B, and executes control to cause each of the weighing units to carry out the operation as in the weighing unit B. By providing the plurality of weighing units, a productivity within a specified time can be improved, and hence the combination weigher can be easily adapted to a larger number of packaging machines. Alternatively, each weighing unit may be provided with the collecting hoppers 23a and 23b (see FIG. 12(d)). In the configuration in which the plurality of weighing units are provided, the lower chute 8 may be omitted, and the objects to be weighed which have been discharged from the belt conveyors 21a and 21b may be fed to the different packaging machine inlets, respectively.

Embodiment 4

A combination weigher according to a fourth embodiment of the present invention has a configuration in which the lower chute 8 is omitted from the combination weigher shown in FIGS. 12(a) to 12(c). The embodiment 4 will be described with reference to FIGS. 12(a) to 12(c). The configuration already described with reference to FIGS. 12(a) to 12(c) is omitted. The embodiment 4 differs from the embodiment 3 in the combination process and the operation timing which are associated with the control unit 20.

Below or in a subsequent stage of the combination weigher of the present embodiment, two packaging machines or a twin-type packaging machine having two inlets which are not shown are/is disposed. The objects to be weighed which have been conveyed on the two belt conveyors 21a and 21b are fed into the inlets (first and second packaging machine inlets) of the associated packaging machines, which package them. At the conveying terminal end portions of the belt conveyors 21a and 21b, the chutes or the collecting hoppers 23a and 23b (see FIG. 12(d)) may be provided to receive the objects to be weighed and feed them into the associated packaging machine inlets. In the present embodiment, the conveying directions of the two belt conveyors 21a and 21b may be reversed. In this case, the first and second packaging machine inlets or the collecting hoppers 23a and 23b (see FIG. 12(d)) are respectively provided at opposite ends of the two belt conveyors 21a and 21b such that inlets or the collecting hoppers 23a and 23b are apart from each other. When the collecting hoppers 23a and 23b are provided, the control unit 20 may be configured to cause the collecting hoppers 23a and 23b to simultaneously discharge the objects to be weighed, based on, for example, feed command signals from packaging machines.

The present embodiment differs from the embodiment 3 in that the control unit 20 performs a combination process using any of the combination processes described in the embodiment 2, and is identical to the embodiment 3 in that the control unit 20 controls the entire combination weigher, which will not be described. In the present embodiment, since two discharge combinations are determined simultaneously by any of the combination processes described in the embodiment 2 and the weighing hoppers 4 belonging to the two discharge combinations discharge the objects to be weighed simultaneously, the two belt conveyors 21a and 21b are driven simultaneously based on, for example, the feed command signal from the packaging machines to convey the objects to be weighed and then to discharge them to the packaging machines, and thereafter are stopped simultaneously. The two discharge combinations are such that, for example, the discharge combination for discharging the objects to be weighed onto the belt conveyor 21a is determined as a first discharge combination, while the discharge combination for discharging the objects to be weighed onto the belt conveyor 21b is determined as a second discharge combination.

In the present embodiment, since two discharge combinations are determined in one combination process and the objects to be weighed belonging to the two discharge combinations are discharged simultaneously, a productivity within a specified time can be improved. Since the objects to be weighed belonging to one (first discharge combination) of the two discharge combinations are discharged onto the belt conveyor 21a, and the objects to be weighed belonging to the other (second discharge combination) are discharged onto the belt conveyor 21b, a sufficient distance can be provided between a batch of the objects to be weighed which are discharged previously and a batch of the objects to be weighed which are discharged subsequently, on each of the belt conveyors 21a and 21b, making it easy to carry out a high-speed operation. In addition, since the two discharge combinations are determined simultaneously, weights of the objects to be weighed in a larger number of weighing hoppers 4 can be used in the combination calculation for determining the two discharge combinations. As a result, combination weighing precision for the objects to be weighed which are discharged can be improved as a whole.

Whereas in the embodiment 4, one weighing unit B (components obtained by excluding the lower chute 8 and the control unit 20 from the configuration shown in FIG. 12(a) to 12(c)) is provided, a plurality of weighing units similar to the weighing unit B may be provided. In this case, the control unit 20 (see FIG. 12(b)) performs the combination process for each of the plurality of weighing units as in the weighing unit B in the embodiment 4, and executes control to cause each of the weighing units to carry out the operation as in the weighing unit B. By providing the plurality of weighing units, a productivity within a specified time can be improved, and hence the combination weigher can be adapted to a larger number of packaging machines. In this case, also, each weighing unit may be provided with the collecting hoppers 23a and 23b (weighing unit C) as shown in FIG. 12(d).

Figure 13:
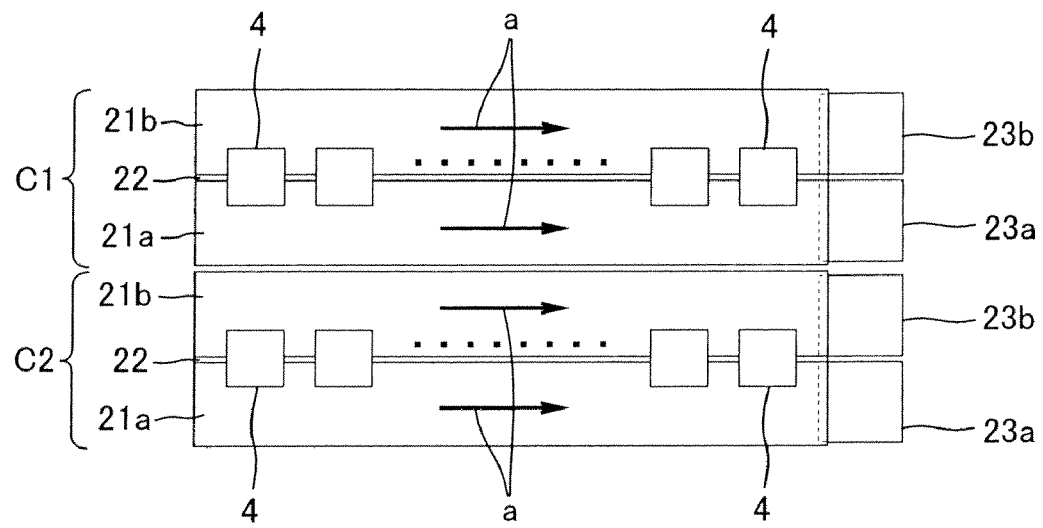
FIG. 13 is a plan view showing an example of arrangement of two weighing units in a configuration in which the two weighing units are provided in an embodiment 4 of the present invention.

FIG. 13 is a plan view showing one example of arrangement of the weighing units in the configuration in which the two weighing units are provided in the embodiment 4. In this case, a first weighing unit C1 and a second weighing unit C2 each having the same configuration as the weighing unit C shown in FIG. 12(d) (configuration in which the weighing unit B is provided with the collecting hoppers 23a and 23b).

Each of the weighing units C1 and C2 includes the drive unit area 1, the vibration feeders 2, the feeding hoppers 3, and others as in the weighing unit B of FIG. 12, although these are not shown. The vibration feeders 2 and others may be suitably positioned according to the locations of the feeding hoppers 3 disposed above the weighing hoppers 4. The control unit 20 (see FIG. 12(b)) performs the combination process for each of the weighing units C1 and C2 as in the weighing unit B in the embodiment 4, and executes control to cause the weighing units C1 and C2 to perform the operation as in the case of the weighing unit B provided with the collecting hoppers 23a and 23b.

Furthermore, if the control unit 20 controls the weighing units C1 and C2 to operate at the same timings in the configuration of FIG. 13, then the units C1 and C2 are able to operate in association with, for example, the packaging machine shown in FIG. 10. In this case, the control unit 20 performs the combination process for the two weighing units C1 and C2 simultaneously, and controls the weighing hoppers 4 in the two weighing units C1 and C2 to perform the discharge operation simultaneously, the conveyors 21a and 21b in the units C1 and C2 to perform the conveying operation simultaneously, and the collecting hoppers 23a and 23b in the units C1 and C2 to perform the discharge operation simultaneously. Thereby, the four collecting hoppers 23 (23a, 23b) discharge the objects to be weighed simultaneously. For example, the funnels 51 of the packaging machines shown in FIG. 10 are disposed just below the four collecting hoppers 23, respectively, and the objects to be weighed which have been discharged from the four collecting hoppers 23 are fed into the packaging containers 55 through the associated funnels 51.

In the embodiment 3 and the embodiment 4, the two belt conveyors 21a and 21b may be replaced by a belt conveyor 21 (see FIGS. 12(c) and 12(d)) having a structure in which the two belt conveyors 21a and 21b are substantially integral. Thereby, one drive circuit is sufficient, and therefore control therefor becomes easier in contrast to the configuration in which the two conveyors are provided. Moreover, if the weighing units C1 and C2 are caused to operate in association with the packaging machine shown in FIG. 10 in the configuration of FIG. 13, the belt conveyors 21a and 21b in the weighing units (C1 and C2) may be integral to form one belt conveyor.

Whereas in the combination weighers in the first to fourth embodiments, only the weighing hoppers 4 are used as the combination hoppers which are hoppers (hoppers which participate in the combination calculation) holding the objects to be weighed whose measured values are used in the combination calculation, such combination hoppers are merely exemplary. FIGS. 14(a), 14(b), 14(c), and 14(d) are plan views schematically showing another example of hoppers such as combination hoppers. FIGS. 14(a), 14(b), 14(c), and 14(d) illustrate the configurations of the embodiments 1 and 2 using the collecting chutes 6a and 6b. In the configurations of the embodiments 3 and 4, the collecting chutes 6a and 6b are replaced by the belt conveyors 21a and 21b or the belt conveyor 21 having a large width.

Figure 14A:
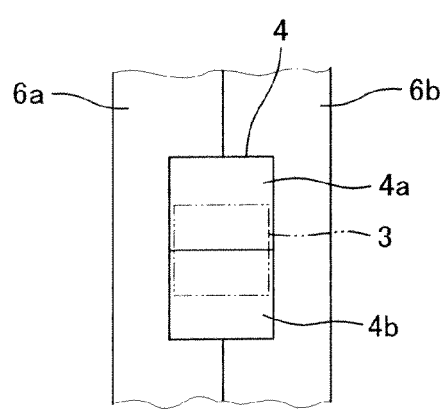
FIGS. 14(a) to 14(d) are schematic views showing another examples of hoppers for use with the combination weighers of the embodiments 1 to 4 of the present invention as viewed from above.
Figure 14B:
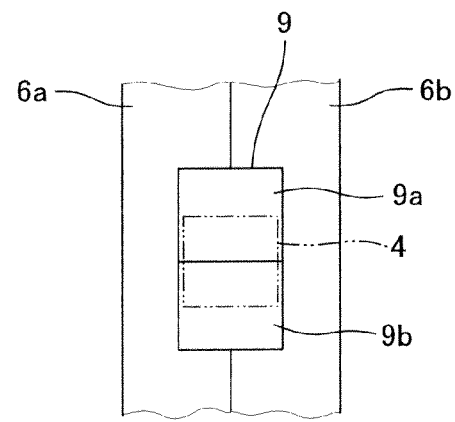
Figure 14C:
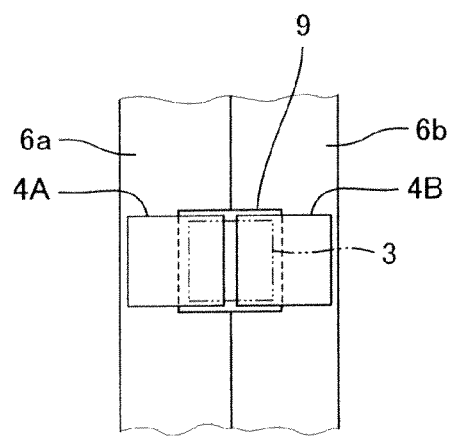
Figure 14D:
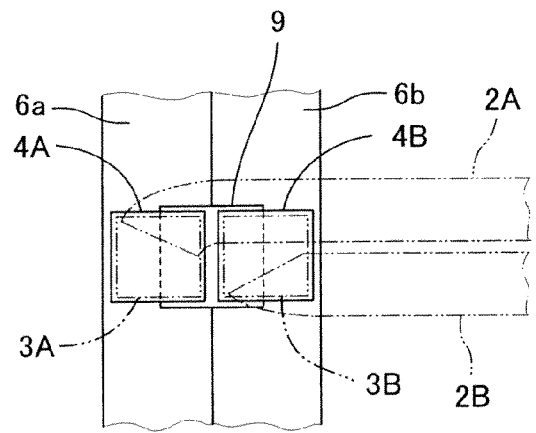

The weighing hoppers 4 in FIGS. 14(a) and 14(b) and the weighing hoppers 4A and 4B in FIGS. 14(c) and 14(d) are each attached with one weight sensor 41 (see FIG. 1(c), FIG. 12(c) and the like).

For example, as shown in FIG. 14(a), each weighing hopper 4 is configured to have two chambers (weighing chambers) 4a and 4b which are respectively fed with the objects to be weighed. The two weighing chambers 4a and 4b of each weighing hopper 4 are arranged side by side in the same direction as the direction in which the plurality of weighing hoppers 4 are arranged. In this case, the feeding hopper 3 is configured to be able to discharge the objects to be weighed selectively to the weighing chamber 4a or to the weighing hopper 4b of the weighing hopper 4. The weighing chambers 4a and 4b of the weighing hopper 4 are each configured to be able to discharge the objects to be weighed selectively to the first collecting chute 6a or to the second collecting chute 6b. The combination calculation is performed using weights (measured values) of the objects to be weighed inside the weighing chambers 4a and 4b of each weighing hopper 4. The weighing hoppers 4a and 4b are candidates to be selected to make up of a discharge combination. In each weighing hopper 4, when only one weighing chamber, for example, only the weighing chamber 4a holds the objects to be weighed, the weight sensor 41 measures the weight of the objects to be weighed inside the weighing chamber 4a. Then, when the other weighing chamber 4b is fed with the objects to be weighed, the weight sensor 41 measures a total weight of the objects to be weighed inside the two weighing chambers 4a and 4b. The control unit 10 or 20 (see FIG. 1(b), FIG. 12(b), and the like ) calculates the weight (measured value) of the objects to be weighed inside the weighing chamber 4b by subtracting the weight of the objects to be weighed inside the weighing chamber 4a from the total weight of the objects to be weighed inside the two weighing chambers 4a and 4b.

In the configuration of FIG. 14(b), a memory hopper 9 having two chambers (accommodating chambers) 9a and 9b which are fed with the objects to be weighed from the weighing hopper 4 is disposed below each weighing hopper 4. The two accommodating chambers 9a and 9b of each memory hopper 9 are arranged side by side in the same direction as the direction in which a plurality of memory hoppers 9 are arranged. The feeding hopper 3 (see FIG. 1, FIG. 12, and the like) for feeding the objects to be weighed to the weighing hopper 4 is not illustrated in FIG. 14(b). In this case, the weighing hopper 4 is configured to be able to discharge the objects to be weighed selectively to the accommodating chamber 9a or to the accommodating chamber 9b of the memory hopper 9, and is configured to not to discharge the objects to be weighed onto the first collecting chute 6a and onto the second collecting chute 6b. The two accommodating chambers 9a and 9b of the memory hopper 9 are each configured to be able to discharge the objects to be weighed selectively to the first collecting chute 6a or to the second collecting chute 6b. The combination calculation is, for example, performed using the weights (measured values) of the objects to be weighed inside the accommodating chambers 9a and 9b of each memory hopper 9, and the accommodating chambers 9a and 9b are candidates to be selected to make up of a discharge combination. In this case, the weighing hopper 4 does not participate in combination calculation. As the weights of the objects to be weighed inside the accommodating chambers 9a and 9b, weights measured in the weighing hopper 4 located thereabove are used. The weighing hopper 4 can participate in combination calculation provided that the weighing hopper 4 and the accommodating chamber 9a or 9b of the associated memory hopper 9 are selected simultaneously to form a combination. For example, when the weighing hopper 4 and the accommodating chamber 9a (or 9b) of the associated memory hopper 9 are selected to make up of a discharge combination simultaneously, the objects to be weighed inside the weighing hopper 4 are discharged onto the first collecting chute 6a or onto the second collecting chute 6b through the accommodating chamber 9a (or 9b).

In the configuration of FIG. 14(c), the weighing hoppers 4A and 4B respectively attached with the weight sensors 41 are arranged side by side in two-line shape, and a memory hopper 9 having one chamber which is fed with the objects to be weighed from the weighing hopper 4A or 4B is disposed below the weighing hoppers 4A and 4B. The weighing hopper 4A may be configured to be held by the base body within the drive unit area I (FIG. 1, FIG. 12, and the like) as in the weighing hopper 4B and the memory hopper 9, or may be held from the direction opposite from the drive unit area 1. In this case, the feeding hopper 3 is configured to be able to discharge the objects to be weighed selectively to the weighing hopper 4A or to the weighing hopper 4B located therebelow. The weighing hopper 4A is configured to be able to discharge the objects to be weighed selectively to the memory hopper 9 or to the first collecting chute 6a. while the weighing hopper 4B is configured to be able to discharge the objects to be weighed selectively to the memory hopper 9 or to the second collecting chute 6b. The combination calculation is performed using the weights (measured values) of the objects to be weighed inside the weighing hoppers 4A and 4B and inside the memory hopper 9. The combination calculation is performed so that the weighing hopper 4B is not selected but the weighing hopper 4A and the memory hopper 9 are selected to form a discharge combination of the objects to be weighed which are discharged onto the first collecting chute 6a, and the weighing hopper 4A is not selected but the weighing hopper 4B and the memory hopper 9 are selected to form a discharge combination of the objects to be weighed which are discharged onto the second collecting chute 6b, for example. As the weight of the objects to be weighed inside each memory hopper 9, the weight obtained by measuring in the weighing hopper 4A or 4B which has fed the objects to be weighed to the memory hopper 9 is used. When determining a discharge combination for discharging the objects to be weighed onto the first collecting chute 6a, the weighing hopper 4B can participate in combination calculation provided that the memory hopper 9 and the weighing hopper 4B located thereabove are selected simultaneously to form a discharge combination. In this case, the objects to be weighed are discharged from the weighing hopper 4B onto the first collecting chute 6a through the memory hopper 9. Likewise, when determining a discharge combination for discharging the objects to be weighed onto the second collecting chute 6b, the weighing hopper 4A can participate in combination calculation provided that the memory hopper 9 and the weighing hopper 4A located thereabove are selected simultaneously to form a discharge combination. In this case, the objects to be weighed are discharged from the weighing hopper 4A onto the second collecting chute 6b through the memory hopper 9.

In the configuration of FIG. 14(d), one feeding hopper 3 in the configuration of FIG. 14(c) is replaced by the two feeding hoppers 3A and 3B, and the hoppers which participate in the combination calculation are the same as those of FIG. 14(c). In this case, vibration feeders 2A and 2B are disposed to respectively correspond to the feeding hoppers 3A and 3B. The vibration feeders 2A and 2B feed the objects to be weighed to the associated feeding hoppers 3A and 3B. The feeding hopper 3A feeds the objects to be weighed to the weighing hopper 4A located therebelow, while the feeding hopper 3B feeds the objects to be weighed to the weighing hopper 4B located therebelow. Thus, since the feeding hoppers 3A and 3B are provided to respectively correspond to the weighing hoppers 4A and 4B, both of the weighing hoppers 4A and 4B forming a pair can be fed with the objects to be weighed if the weighing hoppers 4A and 4B have been selected to make up of a discharge combination and therefore are empty. This makes it possible to suppress reduction of the number of measured values used in later combination calculation and to improve combination weighing precision as compared to the configuration in FIG. 14(c).

In addition to the above, the configuration of the hoppers such as the combination hoppers or the like may be changed in various ways. In the configuration of FIG. 1, FIG. 12 and the like, one measured value for use in the combination calculation is obtained for each weight sensor 41 attached to the weighing hopper 4. On the other hand, in the configuration of FIG. 14(a), two measured values for use in combination calculation are obtained for each weight sensor 41. In the configuration of FIG. 14(b), two measured values for use in the combination calculation are obtained for each weight sensor 41 if the weighing hoppers 4 do not participate in the combination calculation, while three measured values for use in combination calculation are obtained for each weight sensor 41 if the weighing hoppers 4 participate in the combination calculation. In the configurations of FIGS. 14(c) and 14(d), three measured values for use in the combination calculation are obtained for two weight sensors 41. Therefore, with the hopper configurations of FIGS. 14(a) to 14(d), the weight sensors 41 which are expensive are efficiently used. In addition, without increasing the arrangement length of the combination hoppers in the direction in which the combination hoppers are arranged, the number of measured values for use in the combination calculation can be increased so that combination weighing precision is improved.

Whereas in the above described embodiments 1 through 4, the configuration in which the vibration feeders 2 feed the objects to be weighed to the feeding hoppers 3 has been described, such a configuration is exemplary. For example, the objects to be weighed may be fed to the feeding hoppers 3 by manual operation of a human being.

Moreover, in the above described embodiments 1 through 4, the control units 10 and 20 are not limited to being configured as the single control apparatuses, but instead may be each configured to include a plurality of control apparatuses which are disposed in a distributed manner and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A combination weigher of the present invention is useful as a combination weigher which is coupled to a packaging machine operated at a high speed or a packaging machine having a plurality of inlets which is operated at a high speed, etc.

The invention claimed is:

1. A combination weigher comprising:
a single hopper line formed by a plurality of combination hoppers which are arranged in a straight-line shape and are each fed with objects to be weighed, the plurality of combination hoppers being each configured to be able to discharge the objects to be weighed selectively in a first direction which is perpendicular to a direction in which the combination hoppers are arranged, or in a second direction which is perpendicular to the direction in which the combination hoppers are arranged;

a first discharge means which is disposed below the single hopper line and is configured to transfer the objects to be weighed which have been discharged from the combination hoppers in the first direction and to discharge the objects to be weighed to a first discharge position;

a second discharge means which is disposed below the single hopper line such that the first discharge means and the second discharge means are arranged side by side, and is configured to transfer the objects to be weighed which have been discharged from the combination hoppers in the second direction and to discharge the objects to be weighed to a second discharge position;

a combination calculation means configured to determine a first discharge combination and a second discharge combination, the first discharge combination and the second discharge combination each including combination hoppers and each having a combination weight value within an allowable range with respect to a target weight value, the combination weight value being a total of weights of the objects to be weighed which are held by the combination hoppers; and a control means which is configured to cause the combination hoppers belonging to the first discharge combination to discharge the objects to be weighed in the first direction and to cause the combination hoppers belonging to the second discharge combination to discharge the objects to be weighed in the second direction.

2. The combination weigher according to claim 1, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately;

wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means.

3. The combination weigher according to claim 2, the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

4. The combination weigher according to claim 2, wherein the objects to be weighed which have been discharged from the first discharge means and the objects to be weighed which have been discharged from the second discharge means are fed into the same packaging machine inlet.

5. The combination weigher according to claim 1, wherein the combination calculation means is configured to perform a combination process in such a manner that combination calculation is performed based on the weights of the objects to be weighed which are held by the combination hoppers to determine two combinations of the combination hoppers which do not include the same combination hopper and in which combination weight values obtained in the combination calculation fall within the allowable range with respect to the target weight value and to determine one of the two combinations as the first discharge combination and the other as the second discharge combination; and wherein the control means is configured to cause the combination hoppers belonging to the first discharge combination and the combination hoppers belonging to the second discharge combination to discharge the objects to be weighed simultaneously.

6. The combination weigher according to claim 5, wherein the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

7. The combination weigher according to claim 1, wherein the first discharge means consists of a first collecting chute which is disposed below the single hopper line and is configured to gather the objects to be weighed which have been discharged from the combination hoppers in the first direction and to discharge the objects to be weighed from a discharge outlet provided at a bottom part thereof to the first discharge position; and the second discharge means consists of a second collecting chute which is disposed below the single hopper line such that the first collecting chute and the second collecting chute are arranged side by side, and is configured to gather the objects to be weighed which have been discharged from the combination hoppers in the second direction and to discharge the objects to be weighed from a discharge outlet provided at a bottom part thereof to the second discharge position.

8. The combination weigher according to claim 1, wherein the first discharge means includes a first collecting chute which is disposed below the single hopper line, and is configured to gather the objects to be weighed which have been discharged from the combination hoppers in the first direction and to discharge the objects to be weighed from a discharge outlet provided at a bottom part thereof, and a first collecting hopper provided at the discharge outlet of the first collecting chute, and is configured to hold the objects to be weighed which have been discharged from the discharge outlet and to discharge the objects to be weighed to the first discharge position;

wherein the second discharge means includes a second collecting chute which is disposed below the single hopper line such that the first collecting chute and the second collecting chute are arranged side by side, and is configured to gather the objects to be weighed which have been discharged from the combination hoppers in the second direction and to discharge the objects to be weighed from a discharge outlet provided at a bottom part thereof, and a second collecting hopper provided at the discharge outlet of the second collecting chute, and is configured to hold the objects to be weighed which have been discharged from the discharge outlet and to discharge the objects to be weighed to the second discharge position;

and wherein the control means is configured to control the first collecting hopper and the second collecting hopper to cause the first collecting hopper holding the objects to be weighed which have been discharged from the combination hoppers to discharge the objects to be weighed and to cause the second collecting hopper holding the objects to be weighed which have been discharged from the combination hoppers to discharge the objects to be weighed.

9. The combination weigher according to claim 8, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately;

wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means, and is configured to cause the first collecting hopper and the second collecting hopper to discharge the objects to be weighed alternately.

10. The combination weigher according to claim 9, wherein the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

11. The combination weigher according to claim 9, being configured to feed into the same packaging machine inlet, the objects to be weighed which have been discharged from the first collecting hopper and the objects to be weighed which have been discharged from the second collecting hopper.

12. The combination weigher according to claim 8, wherein the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation fall within the allowable range with respect to the target weight value and to determine one of the two combinations as the first discharge combination and the other as the second discharge combination; and wherein the control means is configured to cause the combination hoppers belonging to the first discharge combination and the combination hoppers belonging to the second discharge combination to discharge the objects to be weighed simultaneously, and is configured to cause the first collecting hopper and the second collecting hopper to discharge the objects to be weighed simultaneously.

13. The combination weigher according to claim 12, wherein the combination calculation means is configured to perform the combination calculation based on weights of objects to be weighed which are held by combination hoppers which do not belong to the first and second discharge combinations determined in a previous combination process, in a subsequent combination process in k times of successive combination processes in the repetitive combination processes, wherein k is a plural number.

14. The combination weigher according to claim 1, wherein the first discharge means includes a first conveyor which is disposed below the single hopper line and is configured to convey in one direction the objects to be weighed which have been discharged in the first direction from the combination hoppers and to discharge the objects to be weighed from a conveying terminal end portion to the first discharge position;

wherein the second discharge means includes a second conveyor which is disposed below the single hopper line such that the first conveyor and the second conveyor are arranged side by side and is configured to convey in the one direction or in another direction the objects to be weighed which have been discharged in the second direction from the combination hoppers and to discharge the objects to be weighed from a conveying terminal end portion to the second discharge position;

and wherein the control means is configured to control the first conveyor's operation for conveying the objects to be weighed and the second conveyor's operation for conveying the objects to be weighed to cause the first conveyor holding the objects to be weighed which have been discharged from the combination hoppers to discharge the objects to be weighed and the second conveyor holding the objects to be weighed which have been discharged from the combination hoppers to discharge the objects to be weighed.

15. The combination weigher according to claim 14, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately; and wherein the control means is configured to cause the combination hoppers belonging to the first discharge combination and the combination hoppers belonging to the second discharge combination to alternately discharge the objects to be weighed, based on the first discharge combination and the second discharge combination alternately determined by the combination calculation means, and is configured to cause the first conveyor and the second conveyor to discharge the objects to be weighed alternately.

16. The combination weigher according to claim 15, the combination calculation means is configured to perform the combination calculation based on weights of objects to be weighed which are held by combination hoppers which do not belong to an optimal combination determined in a previous combination process, in a subsequent combination process in n (n: plural number) times of successive combination processes in the repetitive combination processes.

17. The combination weigher according to claim 15, wherein the first conveyor and the second conveyor are configured to convey the objects to be weighed in the same direction;

and wherein the objects to be weighed which have been discharged from the first conveyor and the objects to be weighed which have been discharged from the second conveyor are fed into the same packaging machine inlet.

18. The combination weigher according to claim 14, wherein the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation fall within the allowable range with respect to the target weight value and to determine one of the two combinations as the first discharge combination and the other as the second discharge combination simultaneously; and wherein the control means is configured to cause the combination hoppers belonging to the first discharge combination and the combination hoppers belonging to the second discharge combination to discharge the objects to be weighed simultaneously, and is configured to cause the first conveyor and the second conveyor to discharge the objects to be weighed simultaneously.

19. The combination weigher according to claim 18, wherein the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

20. The combination weigher according to claim 14, wherein the first conveyor and the second conveyor are integral with each other to form a single conveyor.

21. The combination weigher according to claim 14, wherein the first conveyor and the second conveyor are each capable of changing a direction in which the objects to be weighed are conveyed.

22. The combination weigher according to claim 1, wherein a plurality of weighing units each including the single hopper line, the first discharge means, and the second discharge means are provided;

wherein the combination calculation means is configured to determine the first discharge combination and the second discharge combination with respect to each of the weighing units;

and wherein the control means is configured to cause the combination hoppers belonging to the first discharge combination and the combination hoppers belonging to the second discharge combination in each of the weighing units to discharge the objects to be weighed.

23. The weighing system according to claim 22, wherein the combination calculation means is configured to, for each of the weighing units, perform repetitive combination processes in such a manner that:

combination calculation is performed based on weights of objects to be weighed which are held by the combination hoppers to determine as an optimal combination one combination made up of combination hoppers in which a combination weight value falls within the allowable range with respect to the target weight value, to determine optimal combinations determined sequentially in the repetitive combination processes, as the first discharge combination and the second discharge combination alternately;

wherein the control means is configured to, for each of the weighing units, cause the combination hoppers belonging to the first discharge combination and the combination hoppers belonging to the second discharge combination to alternately discharge the objects to be weighed, based on the first discharge combination and the second discharge combination alternately determined;

and wherein the control means is configured to cause the objects to be weighed which have been discharged from the first discharge means and the second discharge means in the same weighing unit to be fed into the same packaging machine inlet, and is configured to cause the objects to be weighed which have been discharged from the first discharge means and the second discharge means in different weighing units to be fed into different packaging machine inlets.

24. The combination weigher according to claim 23, wherein the combination calculation means is configured to, for each of the weighing units, perform the combination calculation based on weights of objects to be weighed which are held by combination hoppers which do not belong to an optimal combination determined in a previous combination process, in a subsequent combination process in n times of successive combination processes in the repetitive combination processes, wherein n is a predetermined plural number.

25. The combination weigher according to claim 23, wherein the first discharge means includes a first collecting chute which is disposed below the single hopper line and is configured to gather the objects to be weighed which have been discharged from the combination hoppers in the first direction and to discharge the objects to be weighed from a discharge outlet provided at a bottom part thereof to the first discharge position; and the second discharge means includes a second collecting chute which is disposed below the single hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof to the second discharge position.

26. The weighing system according to claim 23, wherein the first discharge means includes a first collecting chute which is disposed below the single hopper line and is configured to gather the objects to be weighed which have been discharged from the combination hoppers in the first direction and to discharge the objects to be weighed from a discharge outlet provided at a bottom part thereof, and a first collecting hopper which is provided at the discharge outlet of the first collecting chute and is configured to hold the objects to be weighed which have been discharged from the discharge outlet and to discharge the objects to be weighed to the first discharge position;

wherein the second discharge means includes a second collecting chute which is disposed below the single hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof, and a second collecting hopper which is provided at the discharge outlet of the second collecting chute and is configured to hold the objects to be weighed which have been discharged from the discharge outlet and to discharge the objects to be weighed to the second discharge position;

and wherein the control means is configured to cause each of the weighing units to discharge the objects to be weighed from the combination hoppers belonging to the first discharge combination and to discharge the objects to be weighed from the combination hoppers belonging to the second discharge combination alternately, and is configured to control the first collecting hopper and the second collecting hopper to cause the first collecting hopper and the second collecting hopper to discharge the objects to be weighed alternately.

27. The combination weigher according to claim 23, wherein the first discharge means includes a first conveyor which is disposed below the single hopper line and is configured to convey in one direction the objects to be weighed which have been discharged from the combination hoppers in the first direction and to discharge the objects to be weighed from a conveying terminal end portion to the first discharge position;

wherein the second discharge means includes a second conveyor which is disposed below the single hopper line such that the first conveyor and the second conveyor are arranged side by side and is configured to convey in the one direction the objects to be weighed which have been discharged from the combination hoppers in the second direction and to discharge the objects to be weighed from a conveying terminal end portion to the second discharge position;

and wherein the control means is configured to, for each of the weighing units, control the first conveyor's operation for conveying the objects to be weighed and the second conveyor's operation for conveying the objects to be weighed to cause the first conveyor and the second conveyor holding the objects to be weighed which have been discharged from the combination hoppers to alternately discharge the objects to be weighed.

28. The combination weigher according to claim 22, wherein the combination calculation means is configured to, for each of the weighing units, perform a combination process in such a manner that combination calculation is performed based on the weights of the objects to be weighed which are held by the combination hoppers to determine two combinations of the combination hoppers which do not include the same combination hopper and in which combination weight values obtained in the combination calculation fall within the allowable range with respect to the target weight value and to determine one of the two combinations as the first discharge combination and the other as the second discharge combination; and wherein the control means is configured to, for each of the weighing units, perform a first discharge process in which the combination hoppers belonging to the first discharge combination and the combination hoppers belonging to the second discharge combination discharge the objects to be weighed simultaneously.

29. The combination weigher according to claim 28, wherein the first discharge means includes a first collecting chute which is disposed below the single hopper line and is configured to gather the objects to be weighed which have been discharged from the combination hoppers in the first direction and to discharge the objects to be weighed from a discharge outlet provided at a bottom part thereof to the first discharge position;

wherein the second discharge means includes a second collecting chute which is disposed below the single hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof to the second discharge position;

wherein the combination calculation means is configured to perform the combination process for respective of the weighing units at the same timing;

and wherein the control means is configured to perform the first discharge process for respective of the weighing units at the same timing.

30. The combination weigher according to claim 28, wherein the first discharge means includes a first collecting chute which is disposed below the single hopper line and is configured to gather the objects to be weighed which have been discharged from the combination hoppers in the first direction and to discharge the objects to be weighed from a discharge outlet provided at a bottom part thereof, and a first collecting hopper provided at the discharge outlet of the first collecting chute and is configured to hold the objects to be weighed which have been discharged from the discharge outlet and to discharge the objects to be weighed to the first discharge position;

wherein the second discharge means includes a second collecting chute which is disposed below the single hopper line such that the first collecting chute and the second collecting chute are arranged side by side and is configured to gather the objects to be weighed which have been discharged from the combination hoppers in the second direction and to discharge the objects to be weighed from a discharge outlet provided at a bottom part thereof, and a second collecting hopper provided at the discharge outlet of the second collecting chute, and is configured to hold the objects to be weighed which have been discharged from the discharge outlet and to discharge the objects to be weighed to the second discharge position;

wherein the combination calculation means is configured to perform the combination process for respective of the weighing units at the same timing;

wherein the control means is configured to perform the first discharge process for respective of the weighing units at the same timing; and wherein the control means is configured to perform a second discharge process in which the first collecting hopper and the second collecting hopper in each of the weighing units discharge the objects to be weighed simultaneously, and is configured to control the first collecting hopper and the second collecting hopper such that second discharge process for respective of the weighing units are performed at the same timing.

31. The combination weigher according to claim 28, wherein the first discharge means includes a first conveyor which is disposed below the single hopper line and is configured to convey in one direction the objects to be weighed which have been discharged from the combination hoppers in the first direction and to discharge the objects to be weighed from a conveying terminal end portion to the first discharge position;

wherein the second discharge means includes a second conveyor which is disposed below the single hopper line such that the first conveyor and the second conveyor are arranged side by side and is configured to convey in the one direction or in another direction the objects to be weighed which have been discharged from the combination hoppers in the second direction and to discharge the objects to be weighed from a conveying terminal end portion to the second discharge position;

wherein the combination calculation means is configured to perform the combination process for respective of the weighing units at the same timing;

wherein the control means is configured to perform the first discharge process for respective of the weighing units at the same timing;

and wherein the control means is configured to perform a second discharge process in which the first conveyor and the second conveyor in each of the weighing units discharge the objects to be weighed simultaneously, and is configured to control the first conveyor's operation for conveying the objects to be weighed and the second conveyor's operation for conveying the objects to be weighed such that second discharge process for respective of the weighing units is performed at the same timing.

32. The combination weigher according to claim 5 wherein the combination calculation means is configured to perform the combination process including:

a first process in which the combination calculation is performed based on the weights of the objects to be weighed which are held by the combination hoppers to determine, as optimal combinations, combinations made up of combination hoppers in which combination weight values fall within the allowable range with respect to the target weight value, and to determine optimal combination pairs each of which is formed by combining two optimal combinations which do not include the same combination hopper; and a second process in which for each of the optimal combination pairs, a total of absolute values of differences between combination weight values of the optimal combinations included in the optimal combination pair and the target weight value is calculated to select one optimal combination pair in which the total of the absolute values of the differences is smallest, and one of two optimal combinations included in the selected optimal combination pair is determined as the first discharge combination and the other optimal combination is determined as the second discharge combination.

33. The combination weigher according to claim 5, wherein the combination calculation means is configured to perform the combination process including:

a first process in which the combination calculation is performed based on weights of the objects to be weighed which are held by the combination hoppers to determine, as allowable combinations, combinations made up of combination hoppers in which combination weight values fall within the allowable range with respect to the target weight value, m (m: plural number) allowable combinations are selected, as first optimal combinations, from the allowable combinations, by giving priority to allowable combinations in which absolute values of differences between combination weight values and the target weight value are smaller, one allowable combination is selected as a second optimal combination from allowable combinations made up of combination hoppers obtained by excluding the combination hoppers belonging to each of the first optimal combinations, and m optimal combination pairs each of which is made up of associated first and second optimal combinations are determined; and a second process in which for each of the optimal combination pairs, a total of absolute values of differences between combination weight values of the first and second optimal combinations and the target weight value is calculated to select one optimal combination pair in which the total of the absolute values of the differences is smallest, one of the first and second optimal combinations included in the selected optimal combination pair is determined as the first discharge combination and the other of the first and second optimal combinations is determined as the second discharge combination.

34. The combination weigher according to claim 5, wherein the combination calculation means is configured to perform the combination process in such a manner that the combination calculation is performed based on the weights of the objects to be weighed which are held by the combination hoppers to determine, as allowable combinations, combinations made up of combination hoppers in which combination weight values fall within the allowable range with respect to the target weight value, to select as a first optimal combination one allowable combination in which an absolute value of a difference between a combination weight value and the target weight value is smallest, from the allowable combinations, to select as a second optimal combination one allowable combination in which an absolute value of a difference between a combination weight value and the target weight value is smallest, from allowable combinations made up of combination hoppers obtained by excluding the combination hoppers belonging to the first optimal combination, and to determine that one of the first and second optimal combinations is the first discharge combination and the other of the first and second optimal combinations is the second discharge combination.

35. The combination weigher according to claim 1, wherein the combination hoppers are weighing hoppers each of which has two weighing chambers arranged side by side in the direction in which the combination hoppers are arranged and is configured to measure weights of the objects to be weighed which are held by the weighing chambers, the weighing chambers being each configured to be able to discharge the objects to be weighed selectively in the first direction or in the second direction; and wherein the combination calculation means is configured to determine the first discharge combination and the second discharge combination such that the first and second discharge combinations each includes weighing chambers holding the objects to be weighed whose total weight falls within the allowable range with respect to the target weight value.

36. The combination weigher according to claim 1, wherein a plurality of weighing hoppers are disposed above the combination hoppers to respectively correspond to the combination hoppers to measure weights of the objects to be weighed which are held by the weighing hoppers;

wherein the combination hoppers are memory hoppers each of which has two accommodating chambers which are fed with the objects to be weighed whose weights have been measured by the weighing hoppers, the accommodating chambers being each configured to be able to discharge the objects to be weighed selectively in the first direction or in the second direction;

wherein the weighing hoppers are each configured to be able to discharge the objects to be weighed selectively to one of two accommodating chambers of an associated memory hopper; and wherein the combination calculation means is configured to determine the first discharge combination and the second discharge combination such that the first and second discharge combinations each includes accommodating chambers holding the objects to be weighed whose total weight falls within the allowable range with respect to the target weight value.

* * * * *

UNITED STATES PATENT AND TRADEMARK OFFICE
CERTIFICATE OF CORRECTION

PATENT NO. : 8,119,934 B2  
APPLICATION NO. : 12/297040  
DATED : February 21, 2012  
INVENTOR(S) : Shozo Kawanishi It is certified that error appears in the above-identified patent and that said Letters Patent is hereby corrected as shown below:

Title Page, Item (75) Inventor:

Delete "Shozo Kawanishi, Nishinomiya (JP)" and replace with -- Shozo Kawanishi, Nishinomiya-shi (JP) --.

Title Page, below Item (54) delete:

"(75) Inventor" and insert -- (76) Inventor --.

Title Page, below Item (75) delete Item (73) Assignee:

"(73) Assignee: Shozo Kawanishi, Nishinomiya-shi (JP)".

Signed and Sealed this  
Twenty-fifth Day of November, 2014

Michelle K. Lee  
*Deputy Director of the United States Patent and Trademark Office*